(12) United States Patent
Nomura et al.

(10) Patent No.: US 6,406,283 B1
(45) Date of Patent: Jun. 18, 2002

(54) DEVICE FOR DRAWING DRAWABLE THERMOPLASTIC RESIN MATERIAL

(75) Inventors: Hidenori Nomura; Kazuyuki Kawasaki; Shinji Ota; Hirofumi Yashiro; Youichi Fujita, all of Gifu (JP)

(73) Assignee: Ube-Nitto Kasei Co., Ltd., Tokyo (JP)

( * ) Notice: Subject to any disclaimer, the term of this patent is extended or adjusted under 35 U.S.C. 154(b) by 0 days.

(21) Appl. No.: 09/622,841
(22) PCT Filed: Feb. 12, 1999
(86) PCT No.: PCT/JP99/00613
§ 371 (c)(1),
(2), (4) Date: Aug. 24, 2000
(87) PCT Pub. No.: WO99/43878
PCT Pub. Date: Sep. 2, 1999

(30) Foreign Application Priority Data

Feb. 28, 1998 (JP) .............................................. 10-064565

(51) Int. Cl.⁷ .............................................. B29C 55/02
(52) U.S. Cl. ......................... 425/71; 425/367; 425/384; 425/394
(58) Field of Search ........................... 425/71, 445, 66, 425/384, 394, 367

(56) References Cited

U.S. PATENT DOCUMENTS 4,863,670 A * 9/1989 Hoj .............................. 425/71

FOREIGN PATENT DOCUMENTS

| JP | 50-18775 | 2/1975 |
| JP | 51-19871 | 2/1976 |
| JP | 60-193632 | 10/1985 |
| JP | 6-57572 | 3/1994 |
| JP | 6-59484 | 8/1994 |

* cited by examiner

Primary Examiner—Nam Nguyen
Assistant Examiner—Thu Khanh T. Nguyen
(74) Attorney, Agent, or Firm—Morgan, Lewis & Bockius LLP

(57) ABSTRACT

A drawing device for handling a wide range of drawable thermoplastic resin materials including a first pressurizing tank and first buffer tank on an upstream side, and a second pressurizing tank and second buffer tank on a downstream side are disposed along a drawing tank having pressurized steam and a discharge unit connected to it. A medium supply and discharge may be connected to each of the first and second pressurizing tanks, and the first and second buffer tanks. Opening members may be disposed on respective upstream and downstream ports along the drawing tank. Small amounts of pressurizing medium may then be allowed to flow into the drawing tank through upstream and downstream ports. Next, material may be supplied from the upstream port into the drawing tank where pressurized steam may be introduced in airtight conditions, and then drawn to the downstream port, thereby producing a drawable thermoplastic resin material.

14 Claims, 10 Drawing Sheets

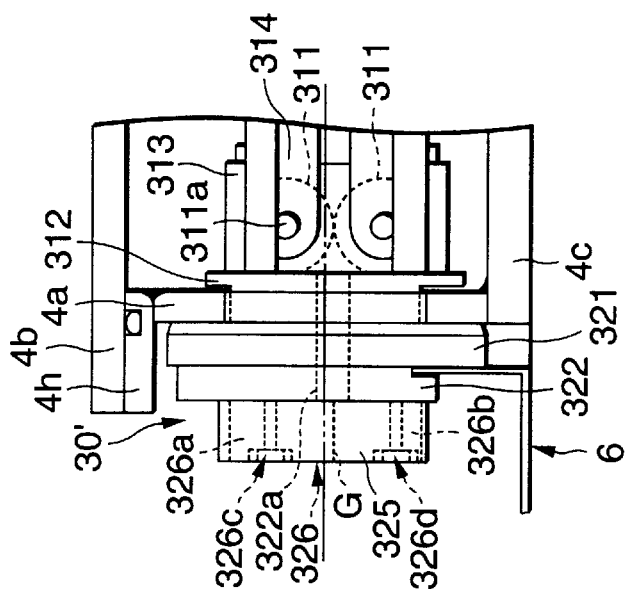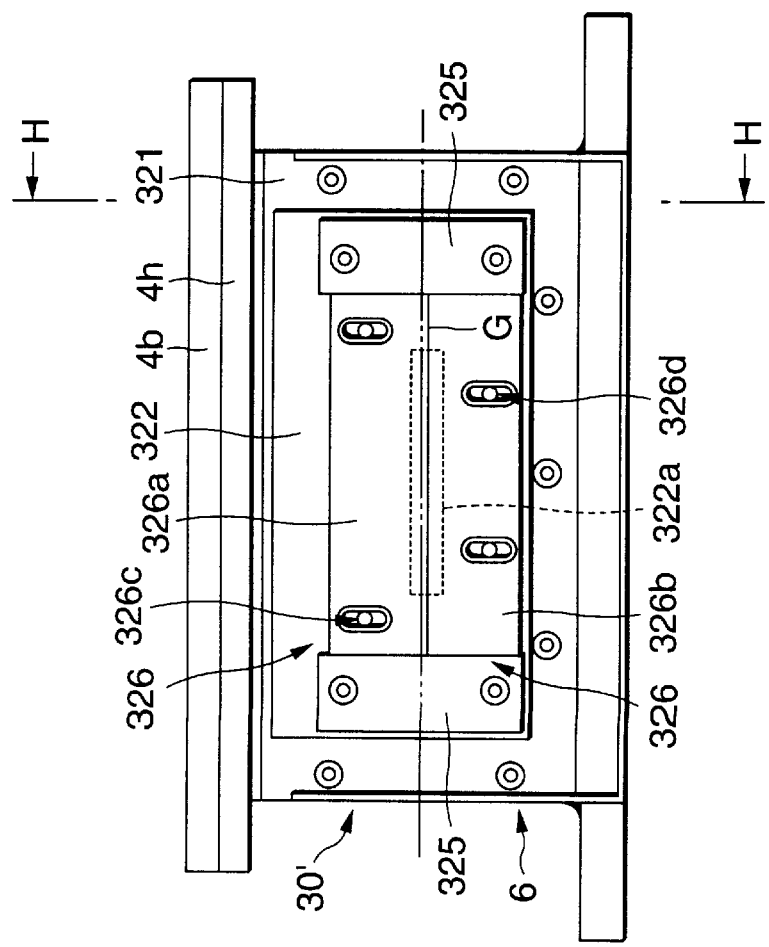

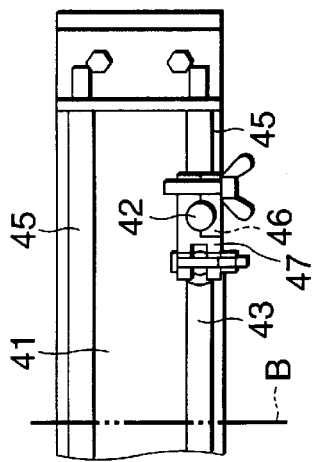
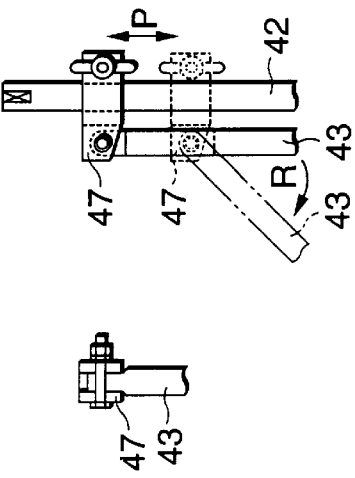
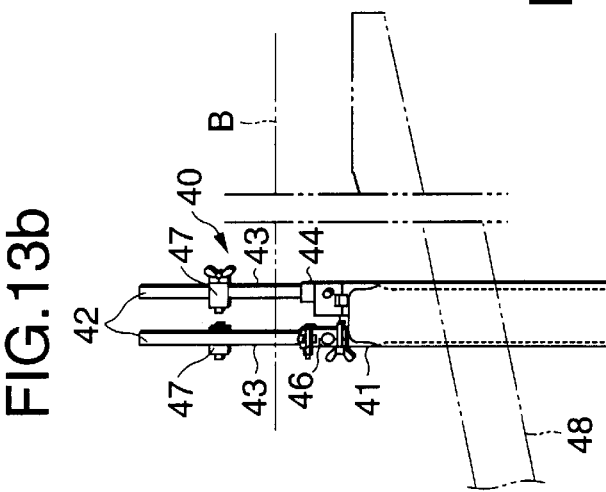
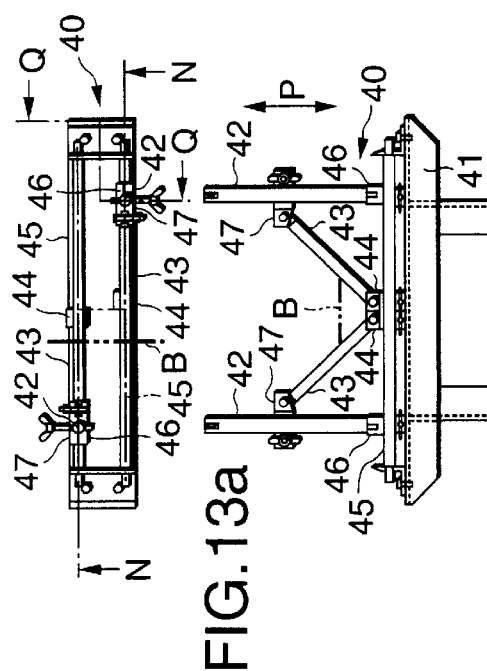

DEVICE FOR DRAWING DRAWABLE
THERMOPLASTIC RESIN MATERIAL

TECHNICAL FIELD

The present invention relates to an improvement in a device for drawing various kinds of drawable materials of thermoplastic resin, such as fibers, films, bands and sheets (hereinafter merely abbreviated as "drawable thermoplastic resin materials" or "drawable materials").

BACKGROUND ART

Drawable thermoplastic resin materials are generally drawn in a post-step in order to improve their physical properties such as strength, Young's moduli, etc. Heretofore, the following devices were used for such drawing.

① A device for drawing a drawable material under contact heating by passing the drawable material through a metal heating roll, a metal hot plate, or the like.

② A device for drawing a high-molecular material by a non-contact heating method while the high-molecular material moves in a pressure-resisting vessel filled with a pressurized fluid, via a supply port and an outlet in the front and rear of the vessel, wherein the supply port and the outlet need to be selected to be such narrow gaps that the pressurized fluid does not leak (as described in JP-A-60-193632).

③ A device for drawing a string by another non-contact heating method-while the string moves in a pressurized steam treatment chamber, wherein multiple stages of labyrinth nozzles are formed in the front and rear of the treatment chamber so that a pressure loss of high-pressure steam is used to prevent steam pressure in the treatment chamber from being lowered to thereby prevent steam from leaking (as described in JP-A-6-57572).

In the device ① using contact heating, both the drawing speed and magnification were limited. In the device ②, there was a difficulty that the drawable material to be drawn was apt to be damaged because the gaps were selected to be as narrow as possible to prevent the pressurized fluid from leaking. In the device ③, it was necessary to increase the number of labyrinth nozzles if the pressure loss was increased to keep the treatment chamber airtight. Hence, the device increased in size because the opportunity of contact with the drawable material to be drawn increased. Hence, the device was apt to get into trouble on quality and operation. There was a difficulty when the drawable material was exchanged to a different type one. The cost of equipment was high. Moreover, the device was only put into practical use in the condition of a steam pressure range of from 2 to 3 Kgf/cm$^2$ and a temperature range of from 120° C. to 133° C.

DISCLOSURE OF THE INVENTION

In order to solve the aforementioned problem, the inventors' eager examination has resulted in the following invention.

An object of the present invention is to provide a device for drawing a drawable thermoplastic resin material, in which: the device can be adapted flexibly to exchange of materials when the drawable thermoplastic resin material to be drawn is exchanged in kind; there is no operational trouble; the device is so compact that the cost of equipment is low; and the drawable thermoplastic resin material can be drawn stably and uniformly with high quality under a high temperature.

Another object of the present invention is to provide a device for drawing a drawable thermoplastic resin material, in which the device can be speedy and surely adapted to the change of the sectional shape or sectional area of the drawable thermoplastic resin material by a simple operation even in the case where the sectional shape of the drawable thermoplastic resin material is changed into a circle, a film, aband, a sheet, a square, or the like, or in the case where the sectional area is changed.

The basic configuration of the present invention to achieve the foregoing objects is as follows.

A first invention is a device for drawing a drawable thermoplastic resin material, comprising: a laterally long drawing tank; a first pressurizing medium tank and a first buffer medium tank sequentially adjacently or closely disposed on an upstream side of the drawing tank; a second pressurizing medium tank and a second buffer medium tank sequentially adjacently or closely disposed on a downstream side of the drawing tank; first and second upstream ports for connecting the drawing tank to the respective upstream side tanks adjacent thereto successively; a third upstream port disposed on an upstream side of the first buffer medium tank; first and second downstream ports for connecting the drawing tank to the respective downstream side tanks adjacent thereto successively; a third downstream port disposed on a downstream side of the second buffer medium tank; a pressurized steam supply unit and a drawing tank discharge unit connected to the drawing tank; a pressurizing medium supply unit and a pressurizing medium discharge unit connected to the first and second pressurizing medium tanks; and a buffer medium supply unit and a buffer medium discharge unit connected to the first and second buffer medium tanks; wherein: opening members each having an opening which is formed substantially along the sectional shape of a drawable material passing therethrough with a slight gap therebetween are disposed, with their centers aligned, at the upstream and downstream ports; a pressurizing medium is allowed to flow in a slight amount into the drawing tank and the first and second buffer medium tanks through the first and second upstream ports and the first and second downstream ports; and an undrawn material supplied from the third upstream port is introduced into the drawing tank into which pressurized steam is introduced and which is kept airtight, is drawn and is led to the third downstream port for withdrawing.

Each of second to sixth inventions is a desirable mode as follows.

In the second invention, a heater is provided in the drawing tank and/or the pressurized stream supply unit so that heating control of an internal atmosphere of the drawing tank can be made.

In the third invention, a reservoir tank communicating with the drawing tank is provided as the drawing tank discharge unit, the liquid level of the reservoir tank is detected by a liquid level sensor, and a valve controller to adjust a valve automatically is actuated, to thereby make it possible to keep the drawing tank airtight.

In the fourth invention, the steam supply unit is formed so that the temperature of the inside of the drawing tank is detected by a temperature sensor, and a valve controller is actuated to adjust a valve automatically to thereby make it possible to keep the inside of the drawing tank at a desired temperature.

In the fifth invention, a packing member is used as each of the opening members and is selected from the group consisting stainless steel as a metal, and fluororesin and silicone resin as plastics.

In the sixth invention, the pressurized steam to be used is composed of water vapor, the pressurizing medium is composed of pressurized water, and the buffer medium is composed of low-pressure water lower in pressure than the pressurized water.

Each of seventh to thirteenth inventions is another desirable mode provided with a sealing device as follows.

The seventh invention is a device for drawing a drawable thermoplastic resin material further comprising a sealing unit disposed between each of the pressurizing medium tanks and adjacent one of the buffer medium tanks, the sealing unit including: a sealing portion constituted by a pair of upper and lower sealing rollers and a pair of side surface sealing plates, the pair of sealing rollers being disposed with a slight gap in a wall surface of a pressurizing tank side fitment fixed to an end surface of the pressurizing medium tank and having a slit formed in its center portion, the pair of sealing rollers being rotatably supported by swing levers pressed by pressing members, the pair of side surface sealing plates being fixed to the pressurizing tank side fitment while being in contact with left and right end surfaces of the sealing rollers; and a slit portion having a buffer tank side fitment, and a shutter, the buffer tank side fitment being fixed to the end surface side of the buffer medium tank adjacent to the pressurizing medium tank and having a slit in its center portion, the shutter being fixed to the buffer tank side fitment and having an opening portion formed with a slight gap substantially along the sectional shape of the drawable material passing therethrough; wherein the slits and the opening portion are disposed in accordance with the passage line of the drawable material so that the amount of the pressurizing medium leaking out can be kept very small by the sealing portion.

According to the eighth invention, the shutter is cut into two at its vertical center portion so that an upper shutter and a lower shutter each of which is shaped so as to be a rectangular plate are formed; vertical guides having vertical facing surfaces are disposed with a distance in the left and right of the upper and lower shutters; and the opening portion is set by adjustment of the vertical gap between the shutters sliding along the vertical guides respectively.

According to the ninth invention, the drawing device further comprises a slit up/down adjuster so that the vertical gap between the shutters can be adjusted by vertical movement of the upper shutter.

According to the tenth invention, the drawing device further comprises a width adjusting portion so that the lateral gap can be adjusted by lateral sliding of width adjusting materials.

According to the eleventh invention, the drawing device further comprises a slit left/right adjuster so that the lateral gap can be adjusted by lateral sliding of width adjusting materials.

According to the twelfth invention, the drawing device further comprises a pressing unit including pressing members attached to a pair of pressing shafts disposed on lower sides of support plates so as to face the upper shutter and/or width adjusting materials to thereby make it possible to press the upper shutter and/or width adjusting materials.

According to the thirteenth invention, a low-frictional plastic sheet material is fixed to any one of the contact surfaces of the side surface sealing plates with the end surfaces of the sealing rollers, the facing surfaces of the upper and lower shutters and the facing side surfaces of the width adjusting materials.

A fourteenth invention is another desirable mode in which the drawing device further comprises rod-like guides disposed in the passage position of the drawable material on the upstream side of the first buffer medium tank and/or on the downstream side of the second buffer medium tank and formed into such a shape that the lateral width between the guides is tapered downward in front view, so that the drawable material to be passed can be moved sideways.

BRIEF DESCRIPTION OF THE DRAWINGS

FIG. 2b is a sectional view taken along the line Y—Y of FIG. 2a.

FIG. 11a is a front view of another example of the sealing unit used in the drawing device according to the present invention.

FIG. 11b is a sectional side view, taken along the line H—H, of part of the sealing unit depicted in FIG. 11a.

FIG. 13a is a sectional front view, taken along the line N—N of FIG. 13c, of an example of the bundling unit used in the drawing device according to the present invention.

FIG. 13b is a sectional side view, taken along the line Q—Q of FIG. 13c, of the bundling unit depicted in FIG. 13a.

FIG. 13c is a plan view of the bundling unit used in the drawing device according to the present invention.

FIG. 13d is an enlarged plan view of a part of FIG. 13c.

FIG. 13e is an enlarged side view of a part of FIG. 13b.

FIG. 13f is an enlarged front view of a part of FIG. 13a.

BEST MODE FOR CARRYING OUT THE INVENTION

The present invention will be described in detail with reference to the drawings but the present invention is not limited to these detailed descriptions and specific embodiments.

The following description will be made with a side of supply of a drawable thermoplastic resin material as an upstream side and a side of withdrawal thereof after drawing as a downstream side.

Figure 1:
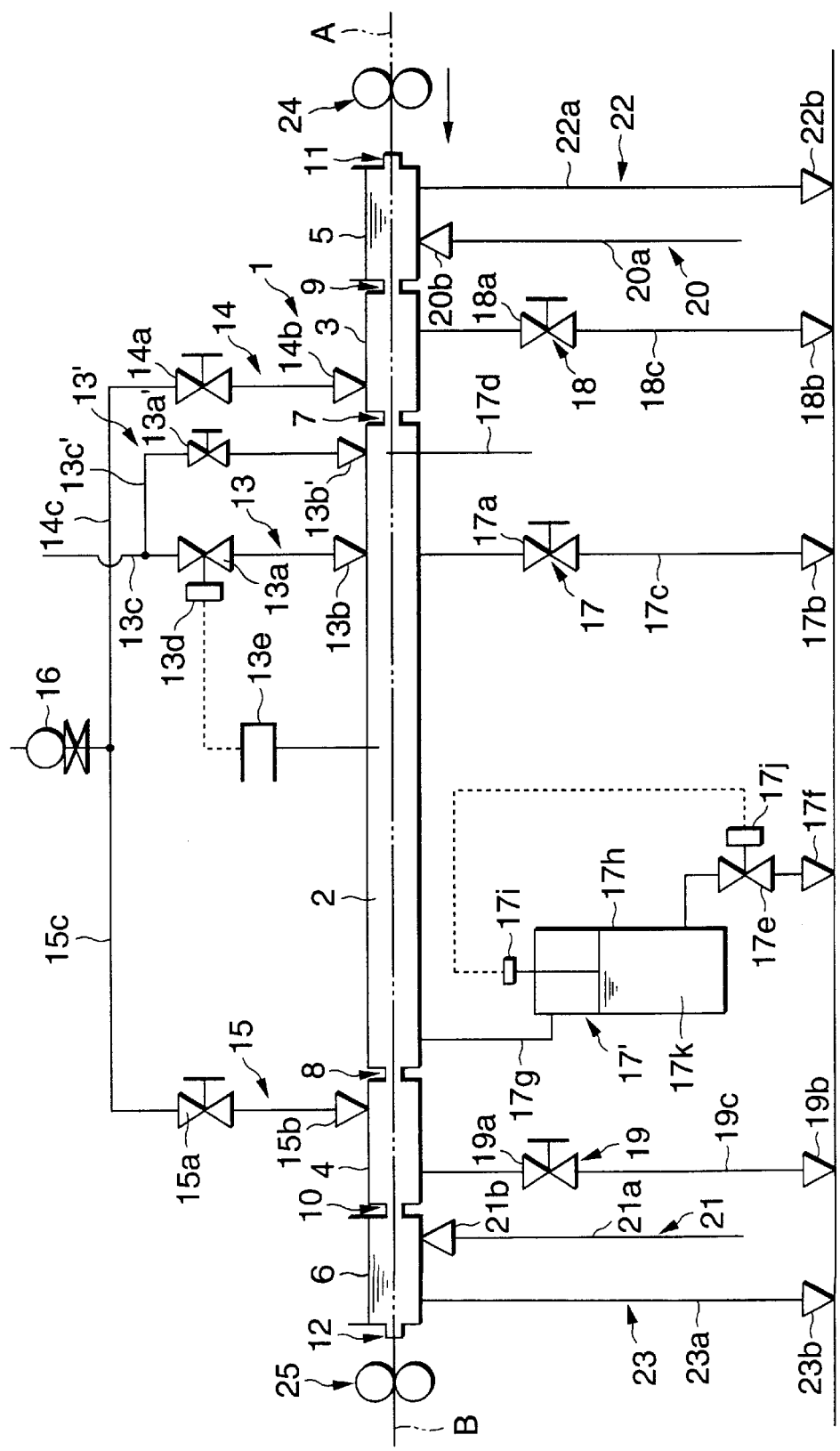
FIG. 1 is an overall schematic explanatory view showing an example of a drawing device according to the present invention.

Referring first to FIG. 1, the whole of a drawing device according to the present invention will be described upon the case where the sectional shape of the drawable thermoplastic resin material to be drawn is substantially circular like a string.

The drawing device 1 according to the present invention has a laterally long drawing tank 2 disposed in a center portion, a first pressurizing medium tank 3 and a first buffer medium tank 5 sequentially and adjacently disposed on an upstream side of the drawing tank 2, and a second pressurizing medium tank 4 and a second buffer medium tank 6 sequentially and adjacently disposed on a downstream side of the drawing tank 2, all of which are disposed between a pair of upstream side supply rollers 24 and a pair of downstream side withdrawing rollers 25 at a distance from the pair of upstream side supply rollers 24 so that an undrawn material A of a thermoplastic resin with a diameter $d_1$ is drawn in the horizontal direction Z by passing therethrough and then a drawn material B with a diameter $d_2$ is obtained. The drawing tank 2 and the first pressurizing medium tank 3 are connected to each other by a first upstream port 7. The first pressurizing medium tank 3 and the first buffer medium tank 5 are connected to each other by a second upstream port 9. A third upstream port 11 is connected to an upstream outer side of the first buffer medium tank 5 so that the undrawn material A can be introduced thereinto. The drawing tank 2 and the second pressurizing medium tank 4 are connected to each other by a first downstream port 8. The second pressurizing medium tank 4 and the second buffer medium tank 6 are connected to each other by a second downstream port 10. A third downstream port 12 is connected to a downstream outer side of the second buffer medium tank 6 so that the drawn material B can be withdrawn therefrom.

The tanks need not always be disposed in such positions apart from one another as shown in FIG. 1. The tanks may be disposed in close positions or may be formed from a single tank partitioned by partition walls. Also in this case, the first and second upstream ports 7 and 9 and the first and second downstream ports 8 and 10 are disposed respectively between the tanks in the same manner as described above except that the ports are shortened.

A steam supply unit 13 having a valve 13a in a path of a pipe arrangement 13c and a supply port 13b at its end is disposed outside the drawing tank 2. Pressurized steam can be supplied from the supply port 13b into the drawing tank 2 by adjustment of the valve 13a. A valve controller 13d is generally operated in accordance with the temperature of the inside of the drawing tank 2 detected by a temperature sensor 13e such as a thermo-couple, so that the adjustment of the valve 13a is made automatically in accordance with the temperature of the inside of the drawing tank 2.

A bypass steam supply unit 13' having a valve 13a', a supply port 13b' and a pipe arrangement 13c' may be preferably disposed as occasion demands. By setting the aperture of the valve 13a' to prevent the temperature of the inside of the drawing tank 2 from exceeding a desired temperature, this is effective for reducing the width of automatic adjustment of the valve 13a to thereby prevent hunting caused by the temperature control.

A drawing tank discharge unit 17 and/or 17' for suitably discharging a drain for supply steam accumulated in the drawing tank 2 as will be described later and the pressurizing medium flowing into the drawing tank 2 from the first pressurizing medium tank 3 via the first upstream port 7 and from the second pressurizing medium tank 4 via the first downstream port 8 are disposed outside and under the drawing tank 2.

The drawing tank discharge unit 17 has a manual valve 17a in a path of a pipe arrangement 17c, a discharge port 17b at its end, and a liquid level sensor 17d.

The drawing tank discharge unit 17' is provided with a reservoir tank 17h which communicates with the drawing tank 2 through a pipe arrangement 17g, for reserving a drawing tank discharge 17k as a mixture of the supply steam drain and the inflow pressurizing medium. The liquid level in the reservoir tank 17h is detected by a liquid level sensor 17i so that a valve controller 17j is actuated to adjust a valve 17e automatically. Hence, the amount by which the drawing tank discharge 17k in the reservoir tank 17h is discharged through a discharge port 17f can be adjusted automatically.

The drawing tank discharge unit 17 is of a manual type whereas the drawing tank discharge unit 17' is of an automatic type. It is necessary to provide at least one of the units 17 and 17'. The two units 17 and 17' may be provided.

Pressurizing medium supply units 14 and 15 having valves 14a and 15a in paths of pipe arrangements 14c and 15c and supply ports 14b and 15b at their ends are disposed outside the first and second pressurizing medium tanks 3 and 4 respectively. A pressurizing medium of the same quality as pressurized saturated steam can be supplied into the first and second pressurizing medium tanks 3 and 4 through the supply ports 14b and 15b by adjustment of the valves 14a and 15a respectively. The adjustment of the valves 14a and 15a is generally made manually. The respective upstream sides of the pipe arrangements 14c and 15c are collectively connected to a pump 16 from a pressurizing medium supply source (not shown) so that a pressurizing medium can be pumped compressively.

Pressurizing medium discharge units 18 and 19 having valves 18a and 19a in paths of pipe arrangements 18c and 19c and discharge ports 18b and 19b at their ends respectively are disposed outside and under the first and second pressurizing medium tanks 3 and 4 respectively. Hence, the pressurizing medium in each of the tanks can be discharged.

Buffer medium supply units 20 and 21 having piping arrangements 20a and 21a and supply ports 20b and 21b at their downstream side ends respectively and buffer medium discharge units 22 and 23 having piping arrangements 22a and 23a and discharge ports 22b and 23b at their downstream side ends respectively are disposed on the first and second buffer medium tanks 5 and 6 respectively. Hence, a low-pressure buffer medium of the same quality as the pressurizing medium can be supplied into and discharged from each of the first and second buffer medium tanks 5 and 6.

Though not shown, a saucer may be preferably disposed for receiving the buffer medium leaking from the third upstream port 11 connected to the upstream outer side of the first buffer medium tank 5 and the third downstream port 12 connected to the downstream outer side of the second buffer medium tank 6, and recovering the buffer medium into the first and second buffer medium tanks 5 and 6.

The first, second and third upstream ports 7, 9 and 11 and the first, second and third downstream ports 8, 10 and 12 are arranged by packing provided as opening members with their centers substantially aligned. The opening members have holes in their opening portions (hereinafter merely referred to as holes) respectively. The holes are formed along the center axis of the drawable thermoplastic resin material passing between clamping portions of the upstream side supply rollers 24 and the downstream side withdrawing rollers 25. The first upstream port 7 will be described below in detail with reference to FIGS. 2a, 2b and 2c but the duplicated description of the other upstream and downstream ports will be omitted.

Figure 2A:
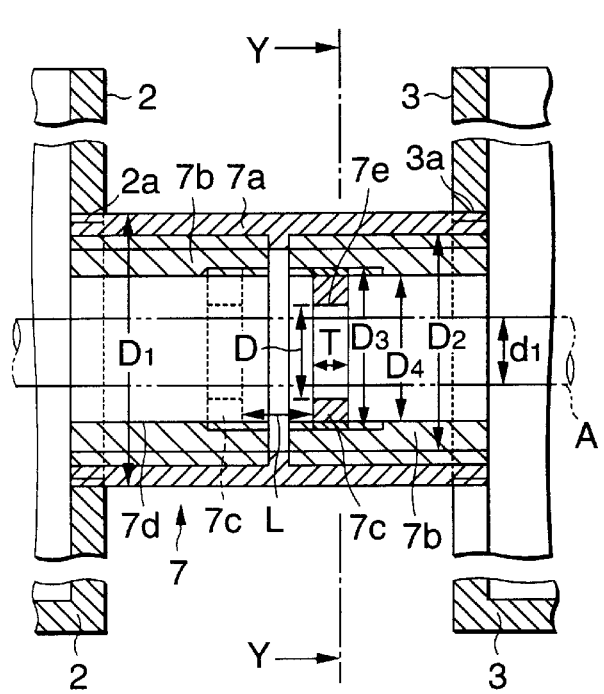
FIG. 2a is a sectional view taken along the line X—X of FIG. 2c.
Figure 2B:
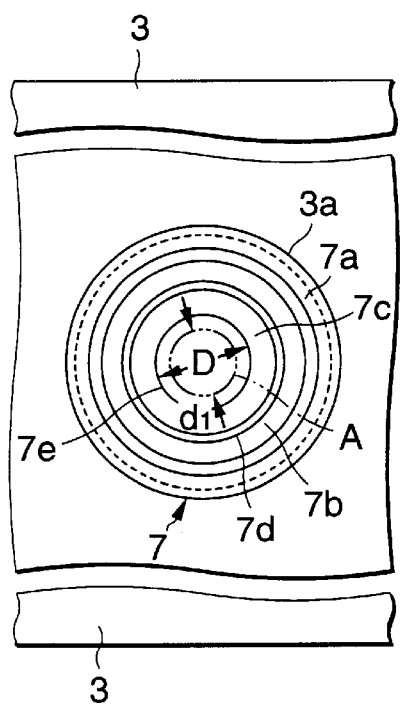
Figure 2C:
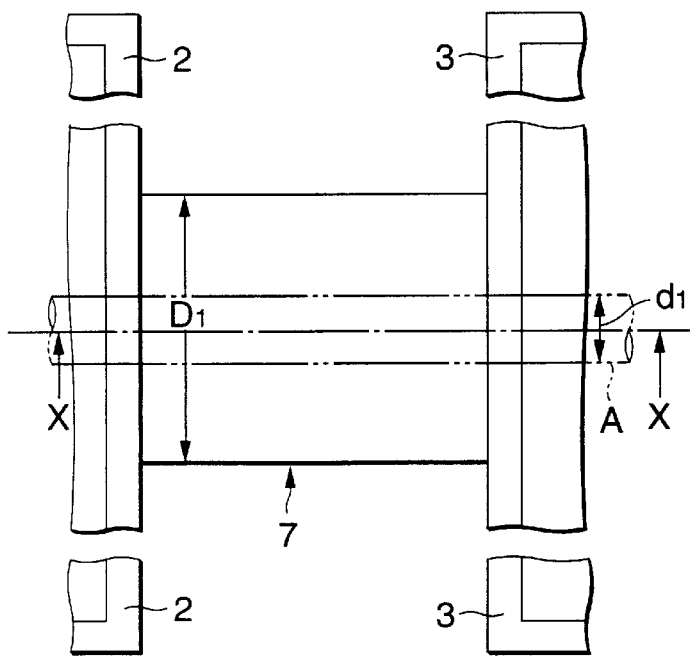
FIG. 2c is a plan view showing an example of the first upstream port used in the drawing device depicted in FIG. 1.

In FIGS. 2a, 2b and 2c, the first upstream port 7 has a connecting pipe 7a, a packing support member 7b, and a packing member 7c.

In this example, the connecting pipe 7a is made of a metal round pipe material having an outer diameter $D_1$ and an inner diameter $D_2$ and having an internal thread on the whole length of the inner surface and external threads at opposite end portions of the outer surface. In this example, the packing support member 7b is constructed by a pair of upstream side and downstream side metal round pipe materials each of which has an outer diameter $D_2$ and an inner diameter $D_4$ and has an external thread on the whole length of the outer surface and an internal thread, with an inner diameter $D_3$, at one end portion of the inner surface so that the internal threads of the respective pipe materials face each other. Alternatively, a packing support member 7b may be provided on either upstream side or downstream side or may be provided only in the center portion between upstream and downstream sides.

In this example, the packing member 7c as an opening member is made of a circular ring material disposed on an upstream side and having an external thread, with an outer diameter $D_3$, on the whole length of the outer surface and a cylindrical hole 7e, with an inner diameter D, formed in the inner surface.

At the first upstream port 7, the external threads in the opposite end portions of the outer surface of the connecting pipe 7a are thread-engaged with internal threads, with an inner diameter $D_1$, in mount holes 2a and 3a formed in positions, respectively, where the drawing tank 2 and the first pressurizing medium tank 3 adjacent to the drawing tank 2 face each other, so that the drawing tank 2 and the first pressurizing medium tank 3 are connected to each other. Alternatively, the connecting pipe 7a may be fixed into the mount holes 2a and 3a not by thread engagement but by welding, or the like.

The internal threads, with an inner diameter $D_3$, in the one-end portions of the inner surfaces of the packing support members 7b respectively are thread-engaged with the external thread, with an outer diameter $D_3$, on the outer surface of the packing member 7c in advance. The external threads, with an outer diameter $D_2$, of the packing support members 7b are thread-engaged with the internal thread, with an inner diameter $D_2$, of the connecting pipe 7a in advance. Hence, the hole 7e formed in the center portion of the packing member 7c is disposed in the connecting pipe 7a so that the center axis of the hole 7e is substantially common with the center axes of holes of other packing members on upstream and downstream sides.

The first upstream port 7 is not limited to the aforementioned configuration. The packing support members 7b may be not thread-engaged with but forced into the connecting pipe 7a or may be omitted so that the packing member 7c can be directly attached to the connecting pipe 7a. The aforementioned configuration, however, can achieve power saving at maintenance preferably because the packing member 7c can be exchanged to a new one by withdrawing only the packing support members 7b from the connecting pipe 7a.

Although the description has been made upon the case where one packing member 7c is disposed at the aforementioned first upstream port 7, a plurality of packing members may be provided in accordance with the material to be drawn and the condition of each medium to be used. In the case of a plurality of packing members, a sealing effect can be expected because a pressure loss of the pressurizing medium can be attained but a great deal of labor is required for maintenance if the number of the packing members is too large. For example, in the case of two packing members, a packing member 7c disposed on a downstream side as expressed by the two-dot chain line in FIG. 2b and a packing member 7c disposed on an upstream side as expressed by the solid line may be provided side by side so as to face each other at a distance L as shown in FIG. 2a.

The second and third upstream ports 9 and 11 and the first, second and third downstream ports 8, 10 and 12 have the same configuration as the aforementioned first upstream port 7. A material having durability, heat resistance and sliding characteristic is used as the material of the packing member 7c. The material is generally preferably selected from a metal such as stainless steel, plastics such as fluororesin and silicone resin, etc. Fluororesin, silicone resin, etc. may be preferably used for the second upstream and downstream ports 9 and 10 which are relatively narrow. Stainless steel, fluororesin, etc. maybe preferably used for the first upstream and downstream ports 7 and 8 and the third upstream and downstream ports 11 and 12 which are relatively wide.

The packing member 7c as an opening member may be replaced by a pipe-like conduit or holes of the same size may be formed in adjacent tanks respectively so that the tanks are arranged closely.

The selection of the size of the inner diameter D of the hole 7e of the opening member at the first upstream port 7 will be described below. If an undrawn material A with a diameter $d_1$ comes into contact with the hole 7e when the undrawn material A is fed from the first pressurizing medium tank 3 into the drawing tank 2 via the first upstream port 7, injury occurs in the surface of the undrawn material A or uneveness occurs in drawing thereof. It is, therefore, preferable that the gap $(D-d_1)/2$ is selected to be as wide as possible. However, if the gap-is selected to be too wide, the inflow of the pressurizing medium from the first pressurizing medium tank 3 into the drawing tank 2 increases. Therefore, the gap $(D-d_1)/2$ can be selected to take a wide value by a method of enlarging the discharge pipe size of the drawing tank discharge unit 17 or 17', a method of opening the valve 17a or 17e, a method of increasing the supply of the pressurizing medium to the pressurizing medium tank 3 by the incremental amount of the pressurizing medium flowing into the drawing tank 2, or the like.

In the present invention, the gap $(D-d_1)$ can take a considerably wide value compared with the background-art drawing device although the gap varies in accordance with the set place. This selection can be applied to the other upstream ports than the first upstream port 7. This selection can be also applied to the downstream ports if the diameter $d_1$ of the undrawn material A is replaced by the diameter $d_2$ of a drawn material B.

In the following description, the difference between the diameter of the undrawn material A in the case where the undrawn material A passes through the first and second upstream ports 7 and 9 except the third upstream port 11 and the value d, on the most upstream side is so negligible that the diameter of the undrawn material A can be regarded as being equal to the value $d_1$. Also the difference between the diameter of the drawn material B in the case where the drawn material B passes through the first and second downstream ports 8 and 10 except the third downstream port 12 and the value $d_2$ on the most downstream side is so negligible that the diameter of the drawn material B can be regarded as being equal to the value $d_2$.

The values of the gaps $(D-d_1)/2$ and $(D-d_2)/2$ are selected so that the pressurizing medium and the buffer medium can flow or leak out slightly. The values are generally preferably selected to be in the following ranges.

A) At the first upstream and downstream ports 7 and 8 for connecting the drawing tank to the pressurizing medium tanks, the values are selected to be relatively large, that is, not larger than 11 mm in order to permit the pressurizing medium to flow from the pressurizing medium tanks into the drawing tank.

B) At the second upstream and downstream ports 9 and 10 for connecting the pressurizing medium tanks to the buffer medium tanks, the values are selected to be relatively small, that is, not larger than 2.5 mm in order to minimize the inflow of the pressurizing medium from the pressurizing medium tanks into the buffer medium tanks.

C) At the third upstream and downstream ports 11 and 12 connected to the upstream and downstream sides of the buffer medium tanks respectively, the values are generally selected to be not larger than 15 mm for prevention of leaking of an excess of the buffer medium unlike the aforementioned paragraphs A) and B) because the buffer medium in the buffer medium tanks is kept at low pressure so that the buffer medium is never spouted out but may leak out.

When the drawable thermoplastic resin material is substantially shaped not like a circle in section such as a string but like a square or an irregular in section such as a film, a band, a sheet, or the like, the diameters of the connecting pipe 7a, the packing support member 7b and the packing member 7c of the first upstream port 7 are selected to have large values $D_1$, $D_2$ and $D_3$ in accordance with the width of the drawable thermoplastic resin material. Further, the sectionally circular shape of the opening portion 7e of the packing member 7c is replaced by a sectionally square or irregular shape so that the values of the gaps $(D-d_1)/2$ and $(D-d_2)/2$ in the case of the aforementioned sectionally circular shape may be substantially taken in accordance with the sectional shape.

Further, the external shapes of the connecting pipe 7a, the packing support member 7b and the packing member 7c may be changed from the sectionally circular shape to a shape larger than the sectionally square or irregular shape of the drawable thermoplastic resin material. Further, the connecting pipe 7a, the packing support member 7b and the packing member 7c may be not thread-engaged with but fitted to one another.

The drawing device according to the present invention can be applied to any drawable thermoplastic resin material and is not specifically limited. For example, the subjects of application are polypropylene, polyethylene, polyacetal, polyoxymethylene, various kinds of polyamide (Nylon-6, Nylon-66, Nylon-12, polyparaphenylene terephthalamide, and so on) and various kinds of polyester (polyethylene terephthalate, polybutylene terephthalate, and so on). Examples of the shape of the drawable material are a string, a film, a band, a sheet, etc. The string includes a monofilament, a multifilament, tow, etc.

The material used in each of the tanks in the drawing device according to the present invention is not specifically limited so long as the material can endure the temperature and pressure of the medium to be used. For example, the material can be selected from metals such as iron, aluminum, etc.; various kinds of hard synthetic resins; and so on. Stainless steel is preferably used from the point of view of rust prevention, cost and processability.

Further, to adjust the drawing condition in the drawing tank, a heating unit maybe provided in the drawing tank 2 and/or the steam supply unit 13 so that the internal atmosphere of the drawing tank can be adjusted by heating as well as by the pressurized steam. A plate heater, a tape heater, a band heater, an embedded heater, etc. may be used singly or in combination as the heating unit. A heating unit configured to have pressure resistance and water resistance may be preferably selected when the heating unit is attached to a position in direct contact with steam.

The operation of the drawing device 1 according to the present invention will be described below.

A drawing medium as pressurized steam is introduced into the drawing tank 2. When, for example, polypropylene fiber is to be drawn, pressurized saturated water vapor having a pressure of from 2 to 5 $Kgf/cm^2$ (in terms of absolute pressure, the same rule applies hereinafter) and a temperature of from 120° C. to 151° C., preferably a pressure of from 3 to 5 $Kgf/cm^2$ and a temperature of from 133° C. to 151° C. is introduced as the drawing medium into the drawing tank 2. The first and second pressurizing medium tanks 3 and 4 are filled with pressurized water which is a pressurizing fluid medium of the same quality as the drawing medium and which is, for example, slightly higher in pressure than the pressurized steam in the drawing tank 2, until the liquid level of the pressurized water reaches a higher level than those at the first upstream and downstream ports 7 and 8. The first and second buffer medium tanks 5 and 6 are filled with, for example, normal-pressure water which is a buffer medium lower (including normal) in pressure than the pressurized water of the same quality as the drawing medium, until the liquid level of the normal-pressure water reaches a higher level than those at the second upstream and downstream ports 9 and 10. In this drawing device, pressurized steam having a pressure of 10 $kgf/cm^2$ may be used so that a tank inside temperature of 180° C. can be obtained.

Besides water, silicone oil, inert gas such as nitrogen gas, or the like, may be used herein selectively as each of the drawing medium, the pressurizing medium and the buffer medium. Water is, however, lowest in cost and easy to handle.

In the following description, the drawing medium, the pressurizing medium and the buffer medium will be described as pressurized saturated water vapor, pressurized water and normal-pressure water, respectively.

Between a gripping portion of the upstream side supply rollers 24 and a gripping portion of the downstream side withdrawing rollers 25, an undrawn material A from the upstream side supply rollers 24 is drawn via third upstream port 11→first buffer medium tank 5→second upstream port 9→first pressurizing medium tank 3→first upstream port 7→drawing tank 2→first downstream port 8→second pressurizing medium tank 4→second downstream port 10→second buffer medium tank 6→third downstream port 12. When the material reaches the downstream side withdrawing rollers 25, the material is obtained as a drawn material B.

In the drawing tank 2, pressurized water from the first and second pressurizing medium tanks 3 and 4 is in a state in which a slight amount of the pressurized water flows into the drawing tank 2 through the gaps $(D-d_1)/2$ and $(D-d_2)/2$ between the drawable material passing through the first upstream and downstream ports 7 and 8 and the holes of opening members. As a result, portions, at the first upstream and downstream ports 7 and 8, of the drawing tank 2 are kept so airtight that the pressurized saturated water vapor never leaks out.

In the first and second buffer medium tanks 5 and 6, pressurized water from the first and second pressurizing medium tanks 3 and 4 is in a state in which a slight amount of the pressurized water flows into the first and second buffer medium tanks 5 and 6 through the gaps between the drawable material passing through the second upstream and downstream ports 9 and 10 and the holes of opening members. Hence, normal-pressure water never flows back to the first and second pressurizing medium tanks 3 and 4.

At the third upstream and downstream ports 11 and 12, the normal-pressure water never spouts out through the gaps between the drawable material passing through the third upstream and downstream ports 11 and 12 and the holes of opening members but leaks out slightly.

The inside of the drawing tank 2 is kept airtight by the function of the aforementioned portions at the first upstream and downstream ports 7 and 8 and the drawing tank discharge unit 17 or 17', so that the pressurized saturated water vapor never leaks out. The internal temperature of the drawing tank 2 can be controlled to be kept constant so that uniform thermal drawing can be achieved.

From the above description, the undrawn material A supplied from the upstream side supply rollers 24 enters the drawing tank 2 after water is deposited on the surface of the undrawn material A in the first buffer medium tank 5 and further in the first pressurizing medium tank 3. Hence, the undrawn material A is never heated until the undrawn material A enters the drawing tank 2. Hence, the undrawn material A can be prevented from being softened in advance.

Just after the drawn material B exits from the drawing tank 2, the drawn material B is cooled in the second pressurizing medium tank 4 and further in the second buffer medium tank 6. Hence, the quality of the drawn material B can be stabilized.

At the respective upstream and downstream ports, gaps are kept between the drawable material passing through the ports and the holes of the opening members. Because the gaps are set to always surround the drawable material by pressurized water or normal-pressure water, the opportunity of the drawable material being damaged by direct contact with the holes of the opening members is so few that there is no trouble on quality and operation.

The adjustment of the valve 13a of the steam supply unit 13 above the drawing tank 2 is made by the valve controller 13d which operates in response to the internal temperature of the drawing tank 2 detected by the temperature sensor 13e. Hence, the internal temperature of the drawing tank 2 is kept constant.

Pressurized water from the first and second pressurizing medium tanks 3 and 4 leaks slightly into the drawing tank 2 through the first upstream and downstream ports 7 and 8. At the same time, drain of pressurized saturated water vapor is accumulated successively. Therefore, the pressurized water is discharged together with the drain of the pressurized saturated water vapor by the drawing tank discharge unit 17 or 17'. However, all the water is not discharged so that the inside of the drawing tank 2 is not opened to the atmospheric pressure. The discharge is controlled so that the liquid level in the drawing tank 2 is not lower than a set level. That is, in the drawing tank discharge unit 17, the valve 17a is manually opened to control the discharge while the liquid level of the liquid level sensor 17d is confirmed by eye observation. Further, in the drawing tank discharge unit 17', the liquid level in the reservoir tank 17h is detected by the liquid level sensor 17i so that the valve controller 17j operates automatically to control the valve 17e to thereby adjust discharge of the drawing tank discharge 17k in the reservoir tank 17h.

Pressurized water transported from the pressurizing medium supply source by the pump 16 is supplied into the first and second pressurizing medium tanks 3 and 4 by manual adjustment of the valves 14a and 15a of the pressurizing medium supply units 14 and 15 respectively. The pressurizing medium in the tanks is suitably discharged by manual adjustment of the valves 18a and 19a of the pressurizing medium discharge units 18 and 19 respectively.

Further, a relief valve may be provided at an outlet of the pump 16 so that the pressure of the pressurizing medium supplied into the first and second pressurizing medium tanks 3 and 4 can be stabilized more greatly.

Normal-pressure water from the buffer medium supply units 20 and 21 is always supplied into the first and second buffer medium tanks 5 and 6 respectively. The normal-pressure water is always discharged from the buffer medium discharge units 22 and 23. Hence, the amount of the normal-pressure water is balanced with the inflow of a slight amount of pressurized water through the second upstream and downstream ports 9 and 10 and the slight leakage from the third upstream and downstream ports 11 and 12.

[Embodiment 1]

A polypropylene fiber multifilament was used as the drawable thermoplastic resin material. An undrawn material A shaped like a circle in section with an apparent diameter $d_1$ of 2 mm in a bundled state was drawn by a drawing magnification of 11 times at a withdrawing speed of 200 m/min by the drawing device 1 according to the present invention. As a result, a polypropylene multifilament was obtained as a drawn material B shaped like a circle in section with an apparent diameter $d_2$ of 0.6 mm in a bundled state.

In the operation of the drawing device 1, pressurized saturated water vapor having a pressure of 4.2 Kgf/cm$^2$ and a temperature of 145° C. in the drawing tank 2 was used as the drawing medium, high-pressure normal-temperature water having a pressure of 4.8 Kgf/cm$^2$ in the pressurizing medium tanks 3 and 4 was used as the pressurizing medium, and normal-pressure normal-temperature water was used as the buffer medium.

All holes 7e of polytetrafluoroethylene packing members were circular. The diameter of each of the holes 7e was set to be 4 mm in the third upstream and downstream ports 11 and 12, 2.5 mm in the second upstream port 9, 1.6 mm in the second downstream port 10, 4 mm in the first upstream port 7 and 4 mm in the first downstream port 8. As a result, the value of each of the gaps $(D-d_1)/2$ and $(D-d_2)/2$ was 1 mm in the third upstream port 11, 1.7 mm in the third downstream port 12, 0.25 mm in the second upstream port 9, 0.5 mm in the second downstream port 10, 1 mm in the first upstream port 7 and 1.7 mm in the first downstream port 8.

The tank length of the drawing tank 2 used herein was 17 m. The capacity of the pump 16 was 21 l/min.

The thus obtained polypropylene multifilament was so stable and uniform as to be high in quality. There was no operational trouble observed.

[Embodiment 2]

A polypropylene fiber multifilament was used as the drawable thermoplastic resin material. An undrawn material A shaped like a circle in section with an apparent diameter $d_1$ of 10 mm in a bundled state was drawn by a drawing magnification of 6 times at a withdrawing speed of 200 m/min by the drawing device 1 according to the present invention. As a result, a polypropylene multifilament was obtained as a drawn material B shaped like a circle in section with an apparent diameter $d_2$ of 4 mm in a bundled state.

In the operation of the drawing device 1, pressurized saturated water vapor having a pressure of 3 Kgf/cm$^2$ and a temperature of 133° C. in the drawing tank was used as the drawing medium, high-pressure normal-temperature water having a pressure of 5 Kgf/cm$^2$ in the pressurizing medium tanks was used as the pressurizing medium, and normal-pressure normal-temperature water was used as the buffer medium.

All holes 7e of polytetrafluoroethylene packing members as the opening members were circular. The diameter of each of the holes 7e was set to be 30 mm in the third upstream and downstream ports 11 and 12, 12 mm in the second upstream port 9, 25 mm in the first upstream port 7, 24 mm in the first downstream port 8 and 8 mm in the second downstream port 10. As a result, the value of each of the gaps $(D-d_1)/2$ and $(D-d_2)/2$ was 10 mm in the third upstream port 11, 13 mm in the third downstream port 12, 1 mm in the second upstream port 9, 2 mm in the second downstream port 10, 7.5 mm in the first upstream port 7 and 10 mm in the first downstream port 8.

The tank length of the drawing tank 2 used herein was 17 m. The capacity of the pump 16 was 200 l/min.

The thus obtained polypropylene multifilament was so stable and uniform as to be high in quality. There was no operational trouble observed.

A sealing unit which has a slit-like opening portion and which is disposed between a pressurizing medium tank and a buffer medium tank adjacent to the pressurizing medium tank in the drawing device according to the present invention so that the sealing unit can be applied to any kind of drawable material by a simple operation speedily and securely will be described below with reference to FIGS. 3 through 12. The setting of the sealing unit is effectively adapted to places of the second upstream and downstream ports 9 and 10 which need to be relatively narrowed as described above. The drawings show a sealing unit used between the second pressurizing medium tank 4 and the second buffer medium tank 6 adjacently located on a downstream side thereof, through which a drawn material B of the drawable material passes. Such a sealing unit may be also used between the first pressurizing medium tank 3 and the first buffer medium tank 5 adjacently located on an upstream side thereof, through which an undrawn material A of the drawable material passes. The latter case can be achieved by substitution of the respective constituent members on the upstream side for those on the downstream side and substitution of the undrawn material for the drawn material. Hence, the detailed description of the latter case will be omitted. Further, in the description of the drawings, upper, lower, left and right directions will be shown by viewing the drawable material passing through the drawing device 1 from the upstream side to the downstream side. With respect to the same or duplicated configuration in laterally symmetric positions, the description of the reference numerals are partially omitted to avoid congestion in the drawings.

In FIGS. 3 through 5 and FIG. 12, the sealing unit 30 has a sealing portion 31 and a slit portion 32 as essential constituent members. The sealing unit 30 further has a slit up/down adjuster 33 and a member 34 for pressing the slit up/down adjuster 33 as selective constituent members. The sealing unit 30 further has a width adjusting portion 35, a slit left/right adjuster 36 and a member 37 for pressing the slit left/right adjuster 36 as selective constituent members. Hence, the drawn material B of the drawable material can be made to pass through the approximately center portion generally in the horizontal direction Z from the upstream side to the downstream side along the line expressed by the two-dot chain line.

In the sealing unit 30, assuming that a downstream end surface 4a of the second pressurizing medium tank 4 generally placed on a platform and an intermediate fitment 321 fixed to the downstream end surface 4a by a fixing member such as bolt, screw, or the like, (merely abbreviated to as "fixing member" also in the following configuration) are disposed as boundaries, the sealing portion 31 is disposed on the second pressurizing medium tank 4 side. The slit portion 32, the slit up/down adjuster 33, the pressing member 34, the width adjusting portion 35, the slit left/right adjuster 36 and the pressing member 37 are disposed on the second buffer medium tank 6 side. The second pressurizing medium tank 4 is formed so as to be surrounded by the downstream end surface 4a, an upstream end surface 4e, a left side surface 4f, a right end surface 4g, a cover 4b and a bottom surface 4c. A reactangular hole 4d is formed in the center portion of the downstream end surface 4a. An outriggered edge 4h is provided horizontally at an upper end of the downstream end surface 4a so that a downstream end of the cover 4b can be placed on the outriggered edge 4h. The second buffer medium tank 6 is generally located on an extension of the platform of the second pressurizing medium tank 4 and formed so as to be surrounded by a downstream end surface 6a, an upstream end surface 6e, a left side surface 6f, a right side surface 6g and a bottom surface 6c. The buffer medium supply unit 21 is connected to the bottom surface 6c. The buffer medium discharge unit 23 is connected to the right side surface 6g. The sealing portion 31 has sealing rollers 311, a pressurizing tank side fitment 312, a side surface sealing plate 313, fixing levers 315, fixing shafts 318, and swing levers 314.

The pressurizing tank side fitment 312 has a flange at its upstream end edge, and a horizontally long rectangular slit 312a formed in the center portion of its section. The pressurizing tank side fitment 312 is idly fitted into the rectangular hole 4d formed in the downstream end surface 4a. An intermediate fitment 321 is fixed by a fixing member so as to face the downstream end surface.

Each of the fixing levers 315 is formed in a long plate shape. The fixing levers 315 are fixed to the upper, lower, left and right positions of the upstream end portion of the pressurizing tank side fitment 312, that is, four fixing levers 315 in total are fixed. The fixing levers 315 are provided so as to protrude toward the upstream side of the second pressurizing medium tank 4. A pair of plate-like connecting materials 316 are laid between the upper and lower fixing levers 315 on the left side of the upstream end and between the upper and lower fixing levers 315 on the right side thereof, respectively.

Each of the fixing shafts 318 is formed in a circle shaped in section. The fixing shafts 318 are disposed as a pair of fixing shafts so that the center axes of the fixing shafts 318 are parallel to each other with a distance in a direction perpendicular to the horizontal direction Z in the plan view shown in FIG. 3. The fixing shafts 318 are fixed by fixing members 317 in the condition that opposite end portions of each of the fixing shafts 318 penetrate upper and lower positions of the connecting materials 316 respectively.

Each of the swing levers 314 is formed in a long plate shape. The swing levers 314 are disposed in upper, lower, left and right close positions in the inside of the connecting members 316 directly or through bearings such as sleeve bearings to be rotatable around the fixing shafts 318 as their center axes, that is, four swing levers 314 in total are disposed. The swing levers 314 extend to the front of an upstream end wall surface 312 of the pressurizing tank side fitment 312. Springs 319 as a pair of pressing members are laid between fitting members 319a such as bolts fixed to the center inner upper and lower portions of the swing levers 314. The springs 319 urge the pair of upper and lower sealing rollers 311, which will be described later, vertically so as to hold the drawn material B at a constant amount of pressure. The springs 319 may be replaced by other pressing members having elasticity such as hydraulic cylinder, pneumatic cylinder, rubber, or the like.

Figure 12:
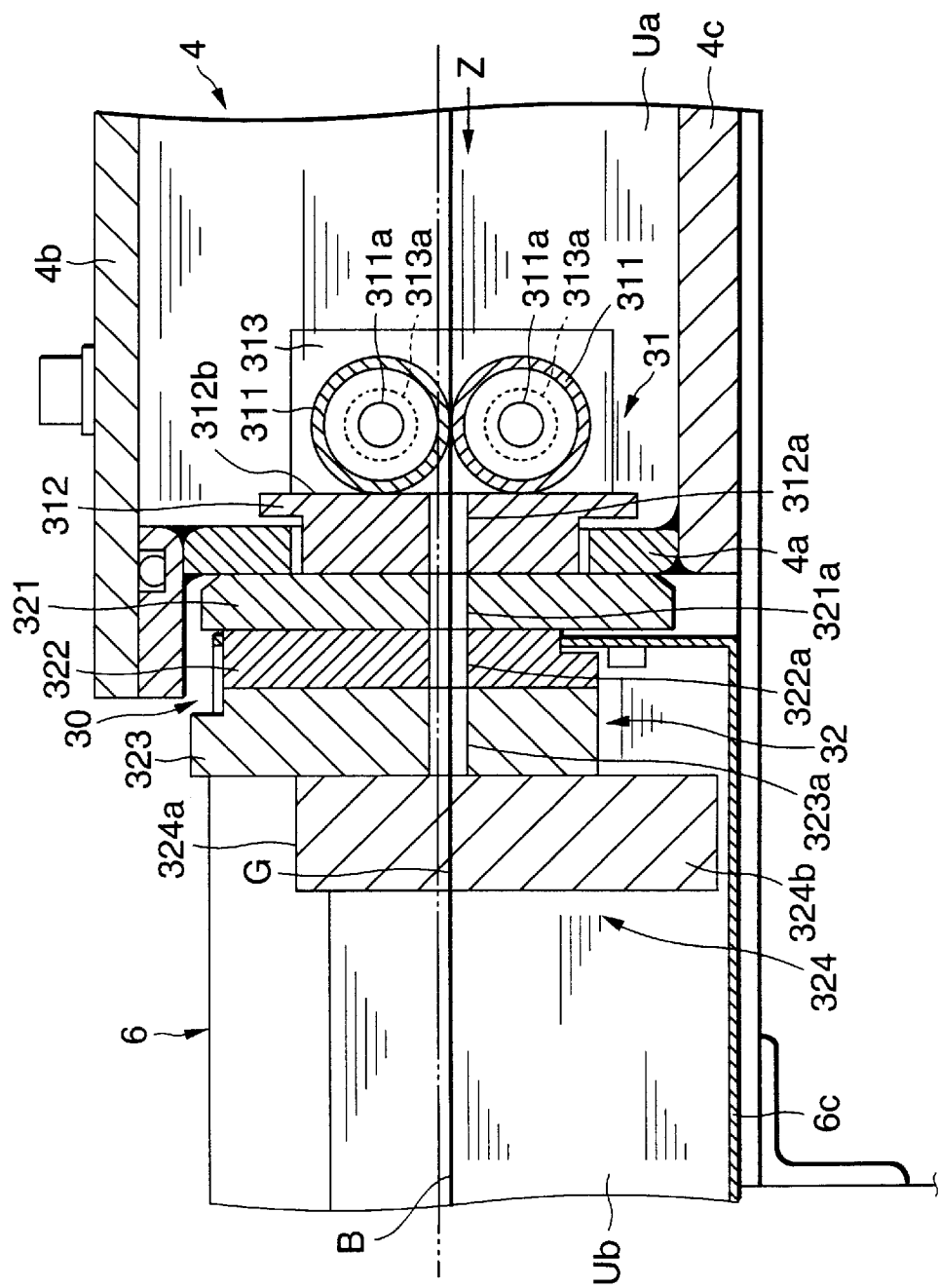
FIG. 12 is a center-line longitudinal sectional side view of only a main part typically showing an actuating state of a part of the sealing unit depicted in FIG. 3.

The sealing rollers 311 are a pair of upper and lower free rollers each of which is shaped so as to be a circle in section. When the drawing device 1 operates, the sealing rollers 311 are in a state in which the sealing rollers 311 are brought into forced contact with each other by the springs 319. The sealing rollers 311 are disposed between the upper left and right swing levers 314 and between the lower left and right swing levers 314, respectively, and rotatably supported directly or through bearings by support shafts 311a fixed to the downstream end portions of the swing levers 314 respectively. The sealing rollers 311 are provided so that a slight gap is kept between the downstream end of the sealing rollers 311 and the upstream end wall surface 312b of the pressurizing tank side fitment 312 facing the downstream end. It is necessary that the clearance is set to be as small as possible in a range in which the sealing rollers 311 can rotate smoothly. For example, the clearance is set to be not larger than 0.08 mm from the point of view of accuracy of finishing the device. Left and right end surfaces 311b of each of the sealing rollers 311 are fixed to the pressurizing tank side fitment 312 while being in contact with a pair of side surface sealing plates 313 respectively. A pair of upper and lower unloaded holes 313a slightly larger than the support shafts 311a and, for example, shaped like a circle, an ellipse, a square, or the like, as shown in FIG. 12 are formed in the side surface sealing plates 313 so that the support shafts 311a can be moved up and down by swinging of the swing levers 314 which will be described later. Though not shown, a low-frictional sheet material of plastics such as fluororesin, MC Nylon, or the like, is preferably stuck to each of the contact surfaces of the side surface sealing plates 313 with the left and right end surfaces 311b of the sealing rollers 311 from the point of view of abrasion resistance.

According to the aforementioned configurations, the pair of upper and lower sealing rollers 311, the left and right side surface sealing plates 313 and the upstream end wall surface 312b, which are disposed in proximity to the slit 312a form a sealing mechanism when the drawing device 1 operates. Hence, the amount of the pressurizing medium leaking from the second pressurizing medium tank 4 into the second buffer medium tank 6 adjacently located on the downstream of the second pressurizing medium tank 4 can be kept slight. Further, when the drawing device 1 operates, the drawn material B can be held at a constant amount of pressure between the pair of upper and lower sealing rollers 311 pressed by the springs 319. Thus, the sealing rollers 311 can follow the change of the thickness of the drawn material B. When the first operation of the drawing device 1 starts, the upper sealing roller 311 can be slightly lifted up against the tensile force of the springs 319 to facilitate setting of the drawn material B. The same thing applies to the case where the springs 319 are replaced by other pressing members.

The slit portion 32, the slit up/down adjuster 33 and the member 34 for pressing the slit up/down adjuster 33 will be described below.

Referring to FIGS. 3, 4, 6 and 9, the slit portion 32 has an intermediate fitment 321, a buffer tank side fitment 322, an adjuster fitment 323, and a shutter 324, and vertical guides 325.

The intermediate fitment 321 is made of a substantially rectangular plate material. The intermediate fitment 321 is disposed between the downstream end surface 4a of the second pressurizing medium tank 4 and the upstream end surface 6e of the second buffer medium tank 6 and fixed thereto by fixing members. The downstream end surface of the pressurizing tank side fitment 312 is fixed to the upstream end surface of the intermediate fitment 321 by fixing members so that the two end surfaces face each other. A rectangular slit 321a laterally long in the horizontal direction is formed in the center portion so as to have substantially the same shape as that of the slit 312a and be located in a position in which the slits 321a and 312a coincide with each other.

The buffer tank side fitment 322 is made of a rectangular plate material. The buffer tank side fitment 322 is provided toward the upstream side from the upstream end surface 6e of the second buffer medium tank 6. The buffer tank side fitment 322 is fixed by fixing members so as to face the downstream end surface of the intermediate fitment 321. A rectangular slit 322a laterally long in the horizontal direction is formed in the center portion of the buffer tank side fitment 322 so as to have substantially the same shape as that of the slit 321a and be located in a position in which the slits 322a and 321a coincide with each other. The intermediate fitment 321 has a function of fixing the buffer tank side fitment 322 and the pressurizing tank side fitment 312 to the downstream end surface 4a of the second pressurizing medium tank 4 indirectly. Hence, the intermediate fitment 321 is very useful for attaching and detaching the buffer tank side fitment 322 and the pressurizing tank side fitment 312. However, when the downstream end surface 4a and the upstream end surface 6e are disposed closely, the intermediate fitment 321 may be omitted so that the buffer tank side fitment 322 and the pressurizing tank side fitment 312 are fixed to the downstream end surface 4a side directly.

The adjuster fitment 323 is made of a rectangular plate material. The adjuster fitment 323 is fixed by fixing members so as to face the downstream end surface of the buffer tank side fitment 322. A rectangular slit 323a laterally long in the horizontal direction is formed in the center portion of the adjuster fitment 323 so as to have substantially the same shape as that of the slit 322a and be located in a position in which the slits 323a and 322a coincide with each other. Hence, the slits 312a, 321a, 322a and 323a substantially have the same shape and are located in a position in which the slits coincide with one another, so that the slits communicate with one another along the line of passage of the drawn material B.

The vertical guides 325 are made of a pair of rectangular parallelepiped materials. The vertical guides 325 are fixed to the lower portion of the downstream end surface of the adjuster fitment 323 by fixing members so that surfaces of the vertical guides 325 facing each other with a lateral distance are disposed in the vertical direction.

A shutter 324 has an upper shutter 324a and a lower shutter 324b each of which is shaped so as to be a rectangular plate and disposed between the left and right vertical guides 325, and positioning units 324c and 324d. A lifting block 333e having an internal thread is fixed to the center portion of the upper end surface of the upper shutter 324a by fixing members so that the internal thread of the lifting block 333e can be thread-engaged with an external thread of a rotation shaft 333a which will be described later. The lifting block 333e forms a fine screw feed mechanism. A pair of positioning units 324c are disposed in the left and right of the upper shutter 324a. The pair of positioning units 324c have a pair of left and right openings piercing the upstream and downstream end surfaces and, for example, each being vertically long so as to be shaped like an ellipse. Head portions of bolts fixed to the adjuster fitment 323 are idly fitted into the long openings and set by fixing members such as nuts. Hence, the upper shutter 324a can be fixed to the adjuster fitment 323. Similarly, a pair of positioning units 324d are disposed in the left and right of the lower shutter 324b. The pair of positioning units 324d have a pair of openings each being vertically long so as to be shaped like an ellipse. The lower shutter 324b can be fixed to the adjuster fitment 323 by head portions of bolts and nuts through the long openings. The shape of each of the long openings is not limited to an ellipse. Any shape such as a rectangular shape, an upper/lower end portion curved shape, or the like, may be used as the shape of the long opening so long as adjustment can be made vertically.

When the drawing device 1 operates, the distance between the lower and upper shutters 324b and 324a disposed between the left and right vertical guides 325 is adjusted as a vertical gap G in accordance with the section of the drawn material B so that the vertical gap G is placed on the line of passage of the drawn material B through the slits 312a, 321a, 322a and 323a.

Low-frictional sheet materials 327 of plastics such as fluororesin, MC Nylon, or the like, may be preferably fixed, by fixing members, to opposite facing sides of the boundary constituted by the vertical gap G which is formed between the upper and lower shutters 324a and 324b and which is the narrowest portion through which the drawn material B passes. Hence, the sheet materials 327 achieve reduction of material abrasion due to contact with the drawn material B as well as prevention of the drawn material B passing through the vertical gap G from being damaged.

Figure 4:
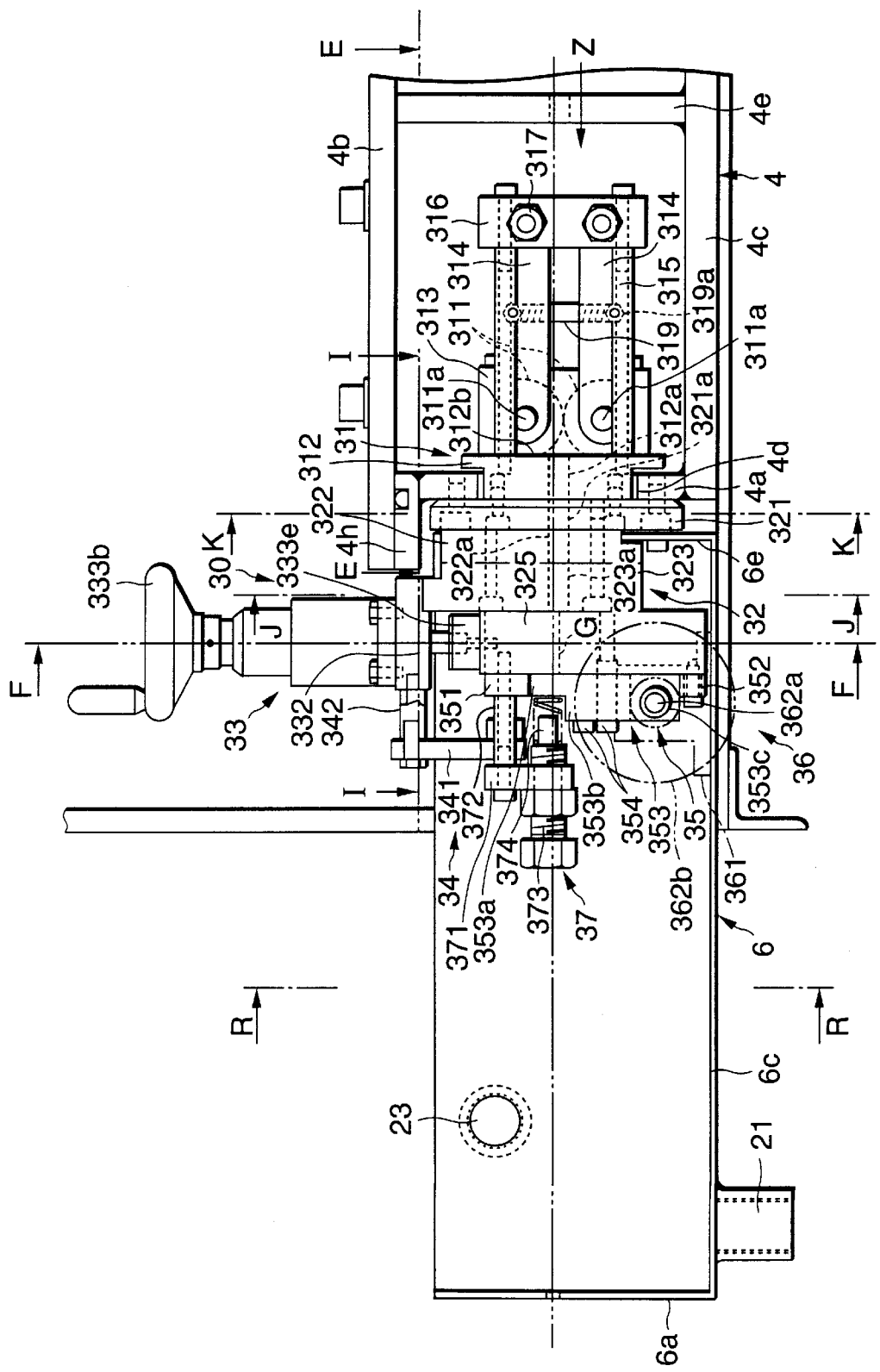
FIG. 4 is a side view from line M—M, of the sealing unit depicted in FIG. 3 used in the drawing device according to the present invention.

As shown in FIG. 4, the slits 312a, 321a, 322a and 323a are generally set to be larger than the vertical gap G. Hence, the initially set passage line of the drawn material B expressed by the two-dot chain line is located slightly above the contact position of the upper and lower sealing rollers 311 and the vertically center positions of the slits 312a, 321a, 322a and 323a and the vertical gap G.

Referring to FIGS. 3 through 5 and FIGS. 9 and 10, the slit up/down adjuster 33 has a bracket 332, and an up/down adjusting portion 333.

The bracket 332 is provided with a notch on the downstream side of the upper end center portion of the adjuster fitment 323 so as to protrude.

The up/down adjusting portion 333 has: a rotation shaft 333a having an external thread in its lower portion and a handle 333b fixed to its upper end portion; a bearing 333c for rotatably supporting the rotation shaft 333a included in a housing 333f fixed onto the bracket 332; and a lifting block 333e fixed to the upper end surface center portion of the upper shutter 324a. A spring 333d for preventing the fine screw feed mechanism from backlash may be preferably attached to the lower portion of the rotation shaft 333a.

According to the aforementioned configurations, the rotation shaft 333a thread-engaged with the lifting block 333e is rotated by manual rotation of the handle 333b. As a result, the lifting block 333e is moved up or down stepwise by a small height in the vertical direction P to thereby make it possible to adjust the vertical gap G between the upper and lower shutters 324a and 324b finely. After the adjustment, the positioning units 324c and 324d are set so that the positions of the upper and lower shutters 324a and 324b are fixed. The head portion of the rotation shaft 333a may be shaped like a polygon to be substituted for the handle 333b so that the head portion can be rotated by a spanner, or the like. Although this embodiment has shown the case where four positioning units 324c and 324d are disposed to make the fixation of the shutter 324 secure, at least one pair of positioning units may be provided in upper and lower positions in accordance with the pressure of the pressurizing medium.

It is preferable from the point of view of minimization of leaking of the pressurizing medium that the vertical gap G is set to be as narrow as possible unless the vertical gap G disturbs drawing. However, if the vertical gap G is too narrow, injury or drawing irregularity is caused by excessive friction of the drawn material B with the upper and lower shutters 324a and 324b. Accordingly, it is preferable that the vertical gap G is generally selected to be not larger than the sum of the sectional width of the drawn material B passing through the vertical gap G and a vertical margin of 4 mm.

Referring next to FIGS. 3 through 5 and FIG. 10, the member 34 for pressing the slit up/down adjuster 33 has a support plate 341, stays 342, pressing shafts 343, and springs 344.

The support plate 341 is made of a rectangular plate material. The support plate 341 has a notch in its upper center portion. The support plate 341 is vertically fixed, by fixing members, to a pair of left and right cylindrical stays 342 which are provided on the downstream end surface of the bracket 332 so as to protrude toward the downstream side. A pair of pressing shafts 343 are provided in the lower left and right of the support plate 341 so as to be disposed toward the upstream side. Springs 344 are mounted on the pressing shafts 343 respectively so that the upper shutter 324a can be pressed toward the upstream side. The springs 344 may be replaced by other pressing members in the same manner as in the springs 319.

Figure 3:
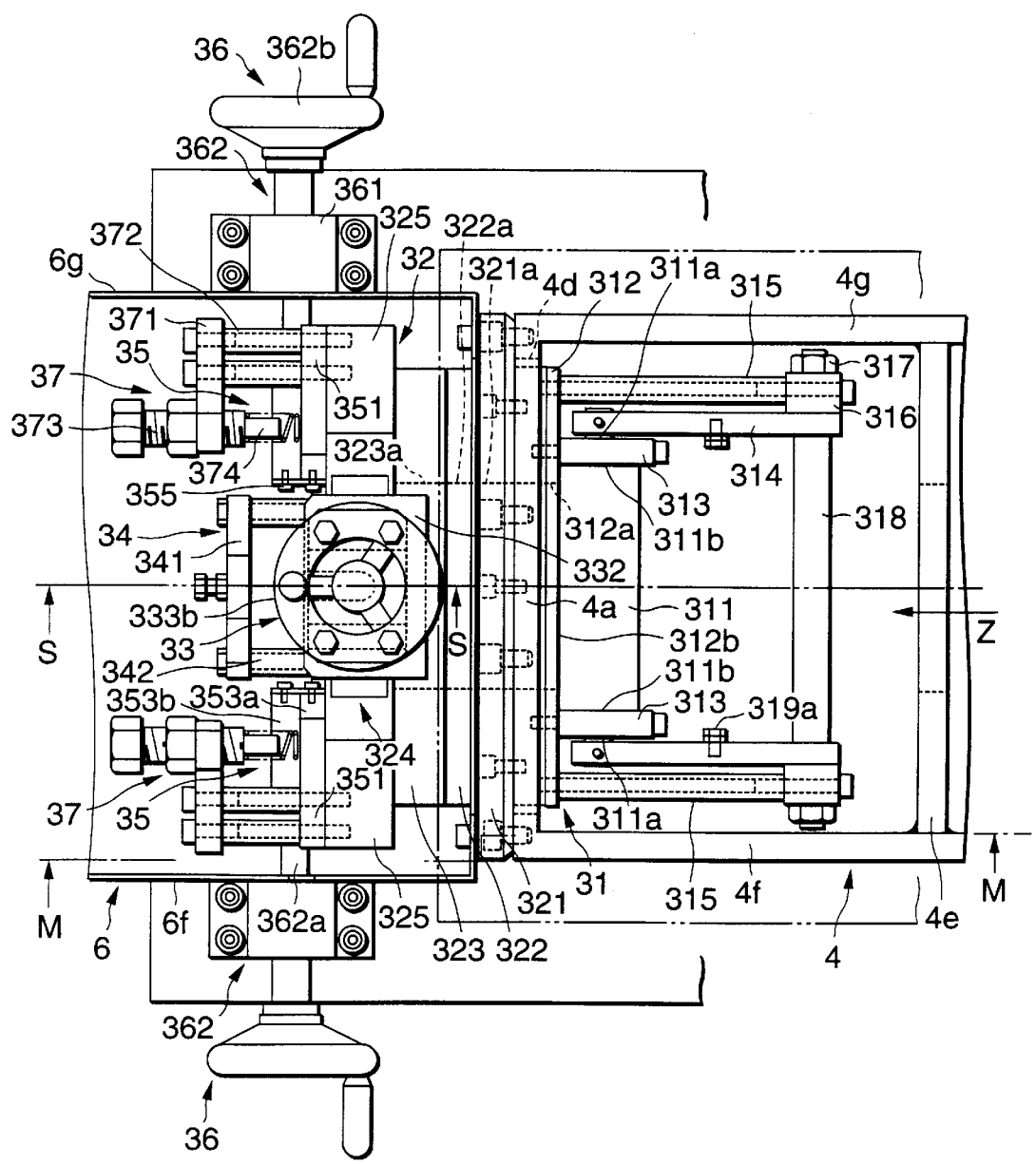
FIG. 3 is a plan view, partly inclusive of a view from line E—E of FIG. 4, showing an example of the sealing unit used in the drawing device according to the present invention.
Figure 5:
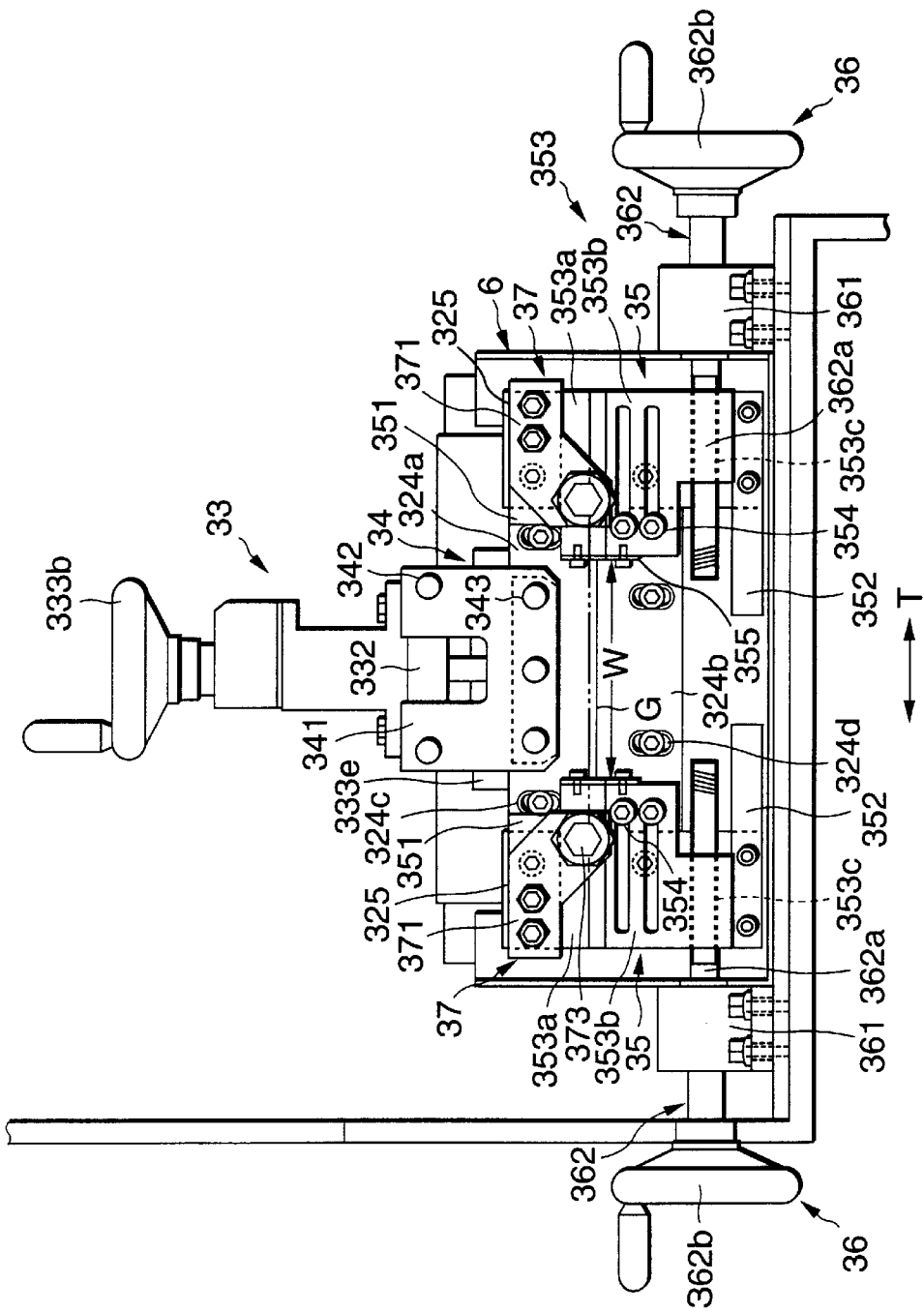
FIG. 5 is a front view of the sealing unit depicted in FIG. 3, viewed from the line R—R of FIG. 4.
Figure 6:
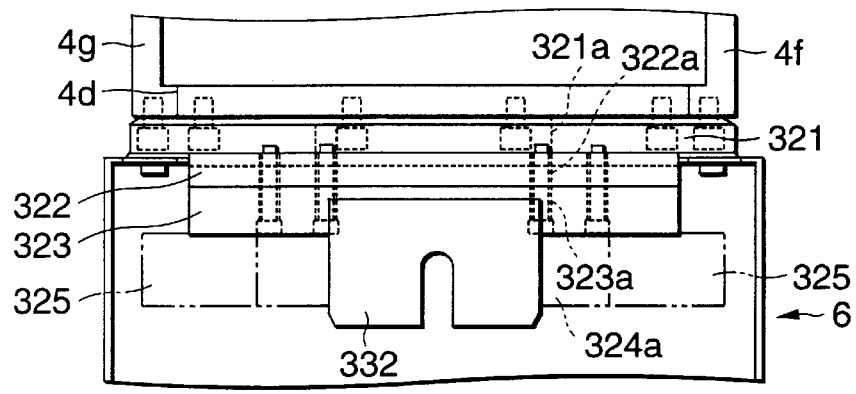
FIG. 6 is a plan view of part of the sealing unit depicted in FIG. 3, viewed from the line I—I of FIG. 4.
Figure 7:
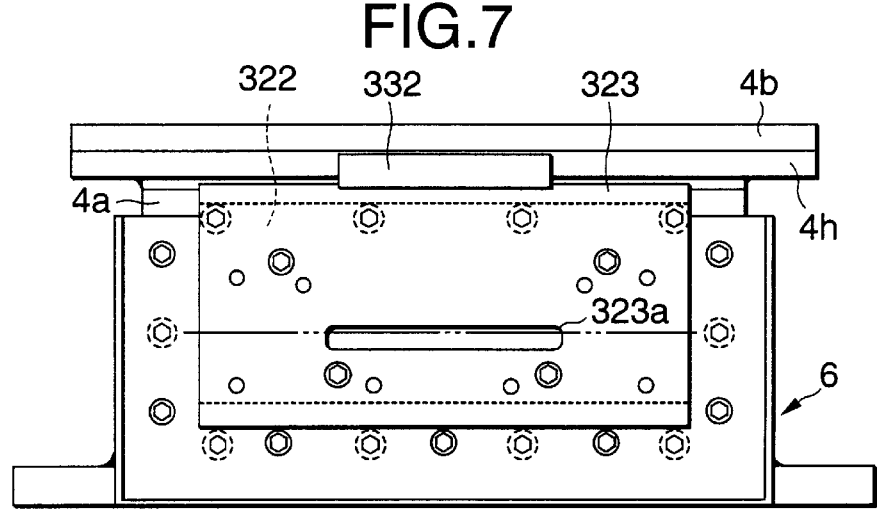
FIG. 7 is a sectional front view, taken along the line J—J of FIG. 4, of the sealing unit depicted in FIG. 3.
Figure 8:
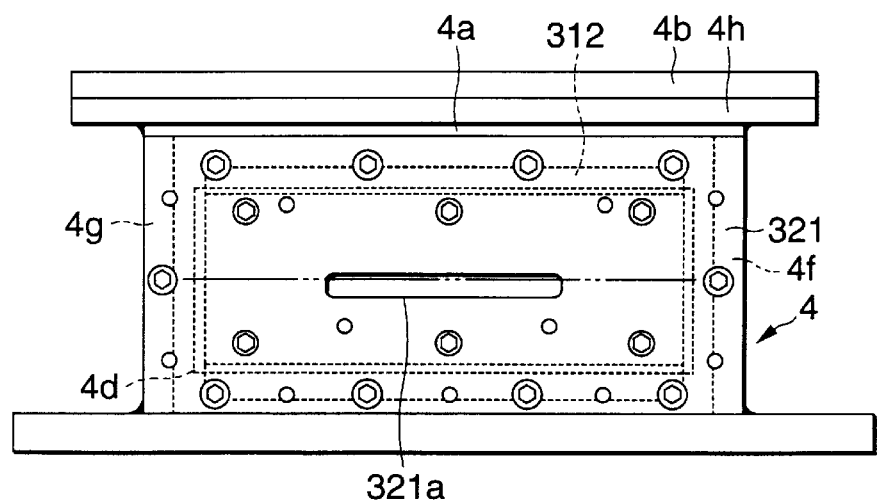
FIG. 8 is a sectional front view, taken along the line K—K of FIG. 4, of the sealing unit depicted in FIG. 3.
Figure 9:
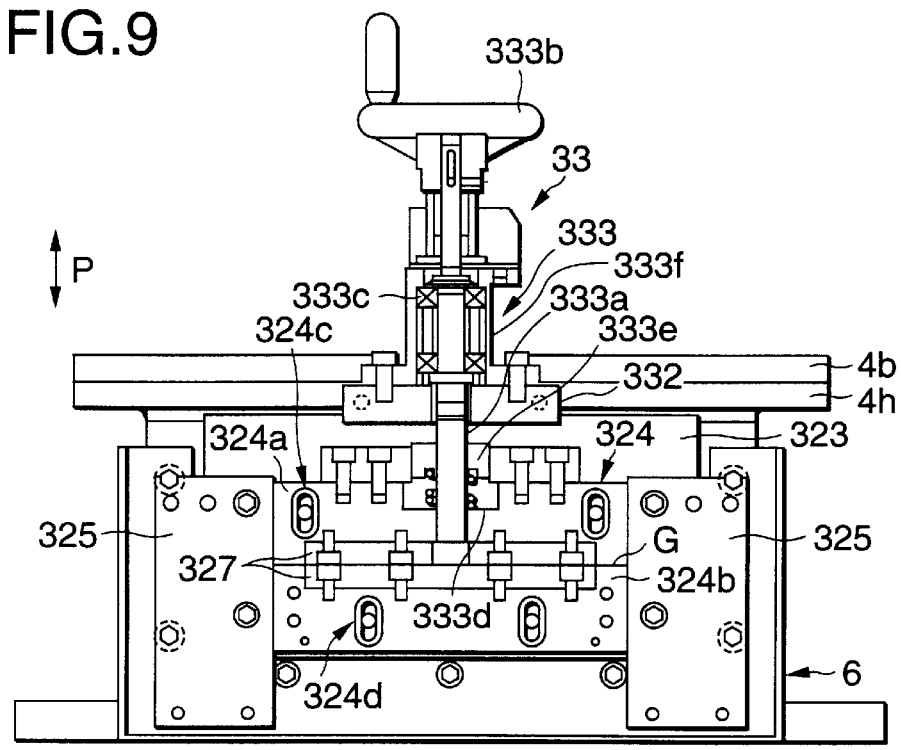
FIG. 9 is a sectional front view, taken along the line F—F of FIG. 4, of the sealing unit depicted in FIG. 3.
Figure 10:
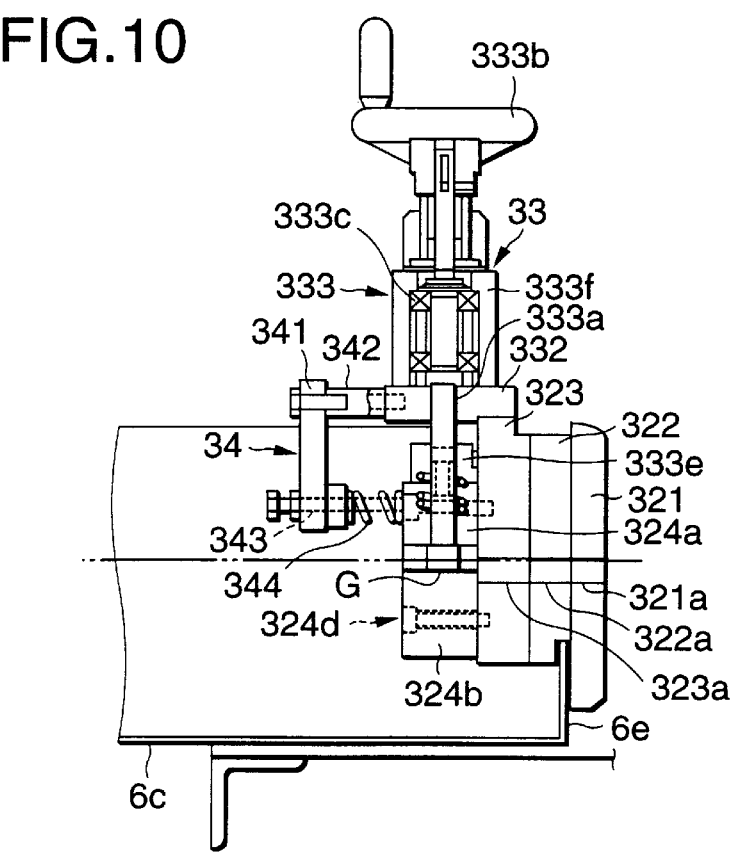
FIG. 10 is a sectional side veiw, taken along the line S—S, of a front portion of the sealing unit depicted in FIG. 3.

Referring to FIGS. 3 through 5, the width adjusting portion 35 has upper horizontal guides 351, lower horizontal guides 352, width adjusting materials 353, and positioning units 354.

The upper horizontal guides 351 are fixed to the upper portions of the downstream surfaces of the pair of vertical guides 325 respectively and each of the upper horizontal guides 351 is shaped so as to be a laterally long rectangle having a lateral width slightly larger than those of the vertical guides 325. The lower horizontal guides 352 are fixed to the lower portions of the downstream surfaces of the pair of vertical guides 325 respectively and each of the lower horizontal guides 352 is shaped so as to be a laterally long rectangle having a lateral width larger than those of the vertical guides 325. A pair of width adjusting materials 353 having vertical side surfaces opposite to laterally symmetric positions between upper and lower parallel surfaces between the upper and lower horizontal guides 351 and 352 are fitted so as to be laterally slidable.

Each of the width adjusting materials 353 has a lower step 353b low in height on the downstream side, and an upper step 353a high in height on the upstream side in the upper end portion. As shown in FIG. 4 which is a side view, each of the width adjusting materials 353 is shaped like stairs. In the lower end portion of each of the width adjusting materials 353, the lateral width is narrowed. As shown in FIG. 5 which is a front view, each of the width adjusting materials 353 is shaped so that the lower portion nearer to the center is cut away. In the lower portion of the lower step 353b, internal threads are thread-cut in a pair of through-holes 353c which are formed so as to extend from the left and right end surfaces thereof toward the lateral center portion of the drawn material to be passed. Hence, the internal threads of the through-holes 353c can be thread-engaged with external threads of rotation shafts 362a which will be described later, whereby a fine screw feed mechanism is formed. The reason why the width adjusting material 353 is shaped like stairs is to facilitate pressing at the time of attachment of the pressing member 37 which will be described later. The width adjusting material 353 may be shaped not like stairs but like a rectangle. Sheet materials 355 similar to the sheet materials 327 may be preferably fixed to the facing side surfaces of the left and right width adjusting materials 353 respectively by fixing members so that the width adjusting materials 353 can be adapted against abrasion due to contact with the drawn material B to be passed.

In the front view shown in FIG. 5, upper and lower pairs of laterally long openings, that is, four laterally long openings in total, for example, each of the four laterally long openings shaped so as to be an ellipse, are provided in the approximately center portions of the lower steps 353b. The head portions of four bolts fixed to the lower shutter 324b are idly fitted into the long openings respectively and set by fixing members such as nuts so that the width adjusting materials 353 can be fixed to the lower shutter 324b. Thus, four positioning units 354 in total are disposed so that the distance between the facing vertical side surfaces of the pair of width adjusting materials 353 can be manually adjusted to a desired lateral gap W. In the positioning units 354, in the same manner as the positioning units 324c and 324d, the shape of each of the long openings is not limited to such an elliptic shape, and any shape may be used so long as lateral adjustment can be made. The width adjusting materials 353 are configured so as to correspond to the shutter 324. The width adjusting materials 353 are used for setting the lateral gap W whereas the shutter 324 is used for setting the vertical gap G.

Referring to FIGS. 3 through 5, the slit left/right adjuster 36 has a pair of housings 361, and a pair of left/right adjusting portions 362. The same constituent parts as those of the slit up/down adjuster 33 are disposed oppositely in symmetric positions with the axes set in the horizontal direction.

A pair of housings 361 are fixed onto a platform outside the second buffer medium tank 6 with the axial direction set horizontally.

Though not shown in detail, the left/right adjusting portions 362 have the same configuration as that of the slit up/down adjuster 33. Bearings for rotatably supporting rotation shafts 362a are included in the housings 361 respectively with the axial direction set horizontally. External threads are thread-cut in the rotation shafts 362a from the center portions of the rotation shafts 362a to the lateral center portion of the drawn material to be passed. Handles 362b are fixed to the left and right end portions so as to be located in laterally symmetric positions respectively. The rotation shafts 362a are thread-engaged with the through-holes 353c respectively to thereby form a fine screw feed mechanism. The length of each of the external threads is set so that the lateral gap W between the width adjusting materials 353 which will be described later takes the desired maximum value.

According to the aforementioned configurations, the rotation shafts 362a thread-engaged with the through-holes 353c are rotated by the manual rotation of the handles 362b respectively. As a result, the width adjusting materials 353 are moved in the left or right direction T successively by a small distance. Hence, the lateral gap W between side surfaces of the pair of left and right width adjusting materials 353 can be adjusted to a desired value finely. Each of the head portions of the rotation shafts 362a may be shaped like a polygon to be substituted for the handle 362b so that the head portion can be rotated by a spanner, or the like. When the positioning units 354 are provided, the positioning units 354 are set to fix the positions of the width adjusting materials 353 after the adjustment of the lateral gap W. Although this embodiment has shown the case where four positioning units 354 are disposed to make the fixture of the width adjusting materials 353 secure, at least one pair of positioning units may be provided in the left and right in accordance with the pressure of the pressurizing medium.

It is preferable from the point of view of reduction in leaking of the pressurizing medium that the lateral gap W is set to be as narrow as possible unless the lateral gap W disturbs drawing. However, if the lateral gap W is too narrow, injury or drawing irregularity is caused by excessive friction of the drawn material B with the width adjusting materials 353. Hence, it is preferable that the lateral gap W is generally set to be not larger than the sum of the sectional width of the drawn material B passing through the lateral gap W and a lateral width margin of 20 mm.

Referring next to FIGS. 3 through 5, the member 37 for pressing the slit left/right adjuster 36 has support plates 371, stays 372, pressing shafts 373, and springs 374.

The support plates 371 are made of a pair of left and right plate materials each having an upper horizontal portion and a lower slope portion continued to the upper horizontal portion. The upper horizontal portions of the support plates 371 are fixed, by fixing members, to left and right pairs of cylindrical stays 372, that is, four cylindrical stays 372 in total, which are fixed to the upper horizontal guides 351 so as to protrude toward the downstream side. The upper horizontal portions of the support plates 371 are disposed in the vertical direction at a distance from the downstream surfaces of the upper horizontal guides 351. A pair of pressing shafts 373 are disposed in the lower slope portions of the support plates 371 respectively so as to face the upstream side. Springs 374 are mounted on the pressing shafts 373 so that the upper steps 353a of the width adjusting materials 353 can be pressed toward the upstream side. The springs 374 may be replaced by other pressing members in the same manner as in the springs 319.

Although the above description has been made upon the case where the slit up/down adjuster 33, the slit left/right adjuster 36 and the width adjusting portion 35 are entirely attached, all of these are not always required but any one of (1) the slit up/down adjuster 33, (2) the width adjusting portion 35 and (3) a combination of the width adjusting portion 35 and the slit left/right adjuster 36 may be selectively attached. Further, all of the pressing members 34 and 37 are not always required but may be selectively attached. Particularly when the pressing member 37 is attached, it may be possible to omit the positioning units 354 in the width adjusting portion 35 in the above description (3).

As an example of the simplest configuration, if the drawn material as a subject applied to the drawing device is fixed in kind, the adjuster fitment 323 maybe omitted and the shutter 324 of the slit portion 32 may be integrated without being divided into upper and lower parts and may be provided with an opening portion having a size corresponding to the vertical gap G and the lateral gap W in accordance with the drawn material B so that the shutter 324 can be fixed to the downstream end surface of the buffer tank side fitment 322.

As another example of a simple configuration in which the applied kind of the drawn material can be changed, a sealing unit 30' will be described with reference to FIGS. 11a and 11b. In FIGS. 11a and 11b, constituent parts the same as those of the sealing unit 30 are referenced correspondingly so that the detailed description thereof will be omitted. In the sealing unit 30', the adjuster fitment 323 is omitted and a shutter 326 is divided into two, upper and lower parts at its center portion so that the two parts are disposed as rectangular plate-like upper and lower shutters 326a and 326b between a pair of left and right vertical guides 325 in the downstream end surface of the buffer tank side fitment 322. Pairs of positioning units 326c and 326d are disposed in the upper and lower shutters 326a and 326b respectively in the same manner as in the positioning units 324c and 324d of the shutter 324. The vertical gap G between the upper and lower shutters 326a and 326b can be adjusted finely so that the upper and lower shutters 326a and 326b are directly moved up and down along vertically long openings of the positioning units 326c and 326d and set by the positioning units 326c and 326d respectively, unlike the adjustment for the shutter unit 324. The width adjusting portion 35 which is omitted in this example may be further attached to the downstream surface of the shutter 326.

An example of a bundling unit 40 as another selected configuration of the drawing device 1 according to the present invention will be described below with reference to FIGS. 13a through 13f.

The bundling unit 40 is disposed between the supply rollers 24 in the drawing device 1 and the first buffer medium tank 5 and/or between the withdrawing rollers 25 and the second buffer medium tank 6. A pair of left and right horizontal shafts 45 are pivotally supported and fixed onto a horizontal-surface platform 41 erected on a floor surface VV so that upper and lower streams are parallel with each other at a distance. Two vertical shafts 42 are erected from two joints 46 respectively. Each of the joints 46 can be fixed to either of left and right end portions of each horizontal shaft 45 so as to be located in a position of intersection by adjustment of the position in the horizontal direction. A pair of rod-like guides 43 are laid from two joints 47 to two joints 44 respectively. The two joints 47 are mounted on the center portions of the vertical shafts 42 respectively so as to be vertically slidable. The two joints 44 are mounted on the center portions of the horizontal shafts 45 respectively so as to be laterally horizontally movable. In the front view shown in FIG. 13a, the guides 43 are approximately shaped like a "V" figure. The inclination angles and lateral positions of the guides 43 can be changed by vertical or lateral adjustment of the respective positions of the joints 44, 46 and 47. After such setting is completed, the joints 44, 46 and 47 are fixed by respective screws provided thereto.

An upper part of the two-dot chain line portion shown in FIGS. 13a through 13d shows the drawn material B and a lower part thereof shows a shoot 48 which receives water falling down from the drawn material B. The two-dot chain line portion shown in FIG. 13f shows a state in which a joint 47 in an upper position is moved down in the vertical direction P and a state in which a guide 43 in the vertical direction is rotated in the clockwise direction R.

The shape of the bundling unit 40 is not limited to the approximate "V" shape shown in FIGS. 13a through 13f. Any shape such as an approximate "V" shape, a "U" shape, a circular arc shape, a trapezoid shape, or the like, may be used so long as the lateral width of the shape is tapered downward gradually in the front view from the downstream side to the upstream side.

The operation of the sealing unit 30 will be described below with reference to FIGS. 3 through 10 and FIG. 12.

The sealing unit 30 in the present invention is attached between the second pressurizing medium tank 4 and the second buffer medium tank 6 adjacently disposed on the downstream side of the second pressurizing medium tank 4. When the drawing device operates, the drawn material B passes substantially in the horizontal direction Z from the upstream side to the downstream side. As represented by the two-dot chain line in FIG. 3, the initially set passage line of the drawn material B is located in a position slightly higher than the contact position of the upper and lower sealing rollers 311 and the respective vertical center positions of the slits 312a, 321a, 322a and 323a and the vertical gap G. This is because the drawn material B is generally deformed slightly at the time of the operation of the drawing device 1 so as to pass through the approximately vertical center position as shown in FIG. 12. The passage line is set initially to allow this phenomenon. The passage line may be set to be in the approximately vertical center position initially in accordance with the drawing condition.

Before the drawing device 1 operates, the lower shutter 324b is generally fixed. Then, the rotation shaft 333a thread-engaged with the lifting block 333e is rotated by the manual rotation of the handle 333b so that the lifting block 333e is moved up and down by a small distance in the vertical direction P. As a result, the upper shutter 324a is moved up and down so that the vertical gap G is set while a thickness gauge is sandwiched between the upper and lower shutters 324a and 324b. If the vertical gap G is set not by the sandwiched thickness gauge but on the basis of the indication of a gap indicator such as SIKO Digital Position Indicator (made by Imao Corporation) which is set in the upper portion of the housing 333f so as to be interlocked with the rotation of the handle 333b, the vertical gap G can be preferably adjusted even in the case where the drawn material is under work.

Then, the rotation shafts 362a are rotated by the manual rotation of the left and right handles 362b so that the width adjusting materials 353 are moved successively by a small distance in the lateral direction T. As a result, the lateral gap W is set and the positioning units are set in accordance with the sectional shape condition of the drawn material B.

The upper and lower sealing rollers 311 in the second pressurizing medium tank 4 are free rollers loaded with a predetermined amount of pressure by the springs 319. The sealing rollers 311 are pulled by the drawing of the drawn material B so as to continue the rotation of the sealing rollers 311 smoothly. Even in the case where the drawn material B passes between the upper and lower sealing rollers 311, the amount of the pressurizing medium leaking from the second pressurizing medium tank 4 into the second buffer medium tank 6 on the downstream side of the second pressurizing medium tank 4 is kept very small by the sealing mechanism constituted by the upper and lower sealing rollers 311 and the side surface sealing plates 313 because the upper and lower sealing rollers 311 pressing each other are disposed in the upstream end wall surface 312b of the pressurizing tank side fitment 312 at a slight clearance and because the side surface sealing plates 313 are in contact with the left and right end surfaces 311b.

The drawn material B passes through the slits 312a, 321a, 322a and 323a larger than the sectional size of the drawn material B, successively from the upstream side. Then, the drawn material B is narrowed to the smallest size in the narrowest portion which is on the downstream side of the most downstream side slit 323a and through which the drawn material B passes, that is, by the preliminarily set vertical gap G between the upper and lower shutters 324a and 324b and the preliminarily set lateral gap W between the width adjusting materials 353. Then, the drawn material B reaches the inside of the second buffer medium tank 6.

FIG. 12 typically shows a general operating state of the sealing unit 30. The pressurizing medium Ua forced into the second pressurizing medium tank 4 is sealed by the upper and lower sealing rollers 311 and the upstream end wall surface 312b of the pressurizing tank side fitment 312 (sealing by the left and right end surfaces 311b and the side surface sealing plates 313 is not shown). The buffer medium Ub is supplied into the second buffer medium tank 6 on the downstream side so that the level of the buffer medium Ub is kept at least higher than the vertical gap G which is formed between the upper and lower shutters 324a and 324b and through which the drawn material B passes. The drawn material B passes through the approximately vertical centers of the slits 312a, 321a, 322a and 323a and the vertical gap G and is delivered from the second pressurizing medium tank 4 to the second buffer medium tank 6 and drawn while the amount of the pressurizing medium Ua leaking out of the second pressurizing medium tank 4 is kept very small.

According to the sealing unit 30, even in the case where the drawable thermoplastic resin material is substantially shaped like a circle in section such as a string or shaped like a square or anomaly in section such as a film, a band, a sheet, or the like, the vertical and lateral gaps G and W can be adjusted in accordance with the sectional shape so that it is possible to adapt the sealing unit 30 flexibly and speedily for the change of the sectional area thereof. Moreover, the vertical and lateral gaps G and W can be selected to be relatively large because the amount of leakage of the pressurizing medium is relatively small compared with the case of an opening member having only a hole as an opening portion without use of the sealing unit 30.

As a specific example, the drawing device 1 having the sealing unit 30 attached thereto was operated continuously at a drawing tank internal pressure of 5 Kgf/cm² while the applied kind was changed in a range of from a fiber bundle to a sheet. As a result, it was possible to perform high-temperature high-pressure drawing without any problem.

When the slit up/down adjuster 33 is not attached, a shutter unit 324 having an opening portion formed in accordance with the drawn material B so as to have a size corresponding to the vertical gap G may be prepared or the vertical gap G may be set by a thickness gauge sandwiched between the upper and lower shutters 326a and 326b of the shutter 326 described above in the sealing unit 30' with reference to FIG. 11b so that the positions of the upper and lower shutters 326a and 326b may be set by the positioning units 326c and 326d in accordance with the working condition of the drawn material B. In this case, in view of workability, generally, to adjust the position of the upper shutter 326a vertically with the thickness gauge put between the upper and lower shutters while the position of the lower shutter 326b is fixed in advance.

When the width adjusting portion 35 is not attached, the opening width of the slit 323a may be selected as the desired lateral gap W. When only the width adjusting portion 35 is attached but the slit left/right adjuster 36 is not attached, the lateral gap W between the pair of left and right width adjusting materials 353 may be adjusted manually and set by the positioning units 354.

In the case where the pressing member 34 is attached, the pressure of the springs 344 attached to the pressing shafts 343 respectively acts on the upper shutter 324a against the pressure of the pressurizing medium from the second pressurizing medium tank 4 when bolts as the head portions of the positioning units 324c and 324d for adjusting the vertical gap G are loosened. Hence, it is effective for preventing the pressurizing medium from leaking out. Similarly, in the case where the pressing member 37 is attached, the pressure of the springs 374 attached to the pressing shafts 373 acts on the upper steps 353a of the width adjusting materials 353 respectively against the pressure of the pressurizing medium from the second pressurizing medium tank 4 when the lateral gap W is adjusted. Hence, it is also effective for preventing the pressurizing medium from leaking out.

Also in the case where the springs 344 and 374 are replaced by other pressing members, the adjustment of the vertical and lateral gaps G and W can be executed easily without losing the pressure of the pressurizing medium.

As described above in detail, when the slit up/down adjuster 33 and the slit left/right adjuster 36 are attached, the vertical and lateral gaps G and W can be preferably adjusted so as to be adapted flexibly and speedily for the change of the applied kind of the drawn material B. Further, the attachment of the pressing members 34 and 37 is effective for preventing the pressurizing medium from leaking out because the pressure of the springs 344 and 374 acts on the upper shutter 324a and the width adjusting materials 353 respectively against the pressure of the pressurizing medium from the second pressurizing medium tank 4. Moreover, the attachment of the pressing members 34 and 37 has an advantage in that the vertical and lateral gaps G and W can be preferably changed when the drawn material B is under work.

The operation of the bundling unit 40 will be described below with the reference to FIGS. 13a through 13f.

When a drawable material shaped like a fiber bundle is to be drawn, the drawable material is fed while being widened into the form of a film in the lateral width direction between the supply rollers 24 and the first buffer medium tank 5 or between the withdrawing rollers 25 and the second buffer medium tank 6. Hence, void portions existing randomly disturb increasing and holding the pressure of the drawing tank 2. However, when the drawable material is made to pass between the guides 43 approximately shaped like a "V" figure, the drawable material is moved sideways to the lateral center portion of the approximate "V" shape so that the void portions are blocked. As a result, the guides 43 act effectively for increasing and holding the pressure. Particularly use of the guides 43 between the withdrawing rollers 25 and the second buffer medium tank 6 after drawing is effective. When the inclination angles and lateral positions of the guides 43 are changed, the drawing device can adapted flexibly for the change of the applied kind of the drawn material B.

INDUSTRIAL APPLICABILITY

The device for drawing a drawable thermoplastic resin material according to the present invention can be adapted flexibly, speedily and securely for the change of the kind of the drawable thermoplastic resin material to be drawn. There is no operational trouble. The device is so compact that the cost of equipment is low. A high-quality drawn material which is stable and uniform under a high temperature is obtained. Even in the case where the drawable thermoplastic resin material is substantially shaped like a circle in section such as a string or shaped like a square or anomaly in section such as a film, a band, a sheet, or the like, or even in the case where the sectional area thereof is changed, the drawing device can be adapted in a wide range.

DESCRIPTION OF THE REFERENCE CHARACTERS

1: drawing device
2: drawing tank

3: first pressurizing medium tank
4: second pressurizing medium tank
5: first buffer medium tank
6: second buffer medium tank
7, 9, 11: first, second and third upstream ports
8, 10, 12: first, second and third downstream ports
7c: packing
7e: hole
13: steam supply unit
13': bypass steam supply unit
13d, 17j: valve controllers
13e: temperature sensor
14, 15: pressurizing medium supply units
17, 17': drawing tank discharge units
17d, 17i: liquid level sensors
17h: reservoir tank
18, 19: pressurizing medium discharge units
20, 21: buffer medium supply units
22, 23: buffer medium discharge units
24: supply rollers
25: withdrawing rollers
30: sealing unit
31: sealing portion
311: sealing roller
312: pressurizing tank side fitment
312a, 321a, 322a, 323a: slits
313: side sealing plate
314: swinging lever
319, 333d, 344, 374: springs
32: slit portion
321: intermediate fitment
322: buffer tank side fitment
323: adjuster fitment
324, 326: shutters
324a, 326a: upper shutters
324b, 326b: lower shutters
324c, 324d, 326c, 326d, 354: positioning units
325: vertical guide
327, 355: sheet materials
33: slit up/down adjuster
333: up/down adjusting unit
333a: rotation shaft
333e: lifting block
34, 37: press members
341, 371: support plates
342, 372: stays
343, 373: pressurizing shafts
35: width adjusting unit
351: upper horizontal guide
352: lower horizontal guide
353: width adjusting material
36: slit left/right adjuster
362: left/right adjusting unit
40: bundling unit
43: guide
A: undrawn material
B: drawn material
D: hole inner diameter
G: vertical gap
P: vertical direction
T: lateral direction
Ua: pressurizing medium
Ub: buffer medium
W: lateral gap
Z: horizontal direction

What is claimed is:

1. A device for drawing a drawable thermoplastic resin material, comprising:

a laterally long drawing tank;

a first pressurizing medium tank and a first buffer medium tank adjacently disposed on an upstream side of said drawing tank;

a second pressurizing medium tank and a second buffer medium tank adjacently disposed on a downstream side of said drawing tank;

first and second upstream ports respectively connecting between said respective upstream side tanks adjacently disposed from said drawing tank;

a third upstream port disposed on an upstream side of said first buffer medium tank;

first and second downstream ports respectively connecting between said respective downstream side tanks adjacently disposed from said drawing tank;

a third downstream port disposed on a downstream side of said second buffer medium tank;

a pressurized steam supply unit and a drawing tank discharge unit respectively connected to said drawing tank;

a pressurizing medium supply unit and a pressurizing medium discharge unit respectively connected to said first and second pressurizing medium tanks;

a buffer medium supply unit and a buffer medium discharge unit connected to said first and second buffer medium tanks; and opening members each having an opening which is formed substantially in accordance with the sectional shape of a drawable material passing therethrough with a slight gap therebetween are disposed, with the center of said opening aligned, at said respective upstream and downstream ports, whereby a small amount of pressurizing medium is allowed to flow into said drawing tank and said first and second buffer medium tanks through said first and second upstream ports and said first and second downstream ports, and an undrawn material supplied from said third upstream port is introduced into said drawing tank into which pressurized steam is introduced and which is kept airtight, is drawn by said drawing tank and is led to said third downstream port for withdrawing.

2. A device for drawing a drawable thermoplastic resin material according to claim 1, wherein a heater is provided in at least one of said drawing tank and said pressurized steam supply unit so that heating control of an internal atmosphere of said drawing tank can be made in addition to heating control of pressurized steam.

3. A device for drawing a drawable thermoplastic resin material according to claim 1 or 2, wherein a reservoir tank communicating with said drawing tank is provided as said drawing tank discharge unit, the liquid level of said reservoir tank is detected by a liquid level sensor and a valve controller is actuated so as to adjust a valve automatically to thereby keep said drawing tank airtight.

4. A device for drawing a drawable thermoplastic resin material according to claim 1, wherein said steam supply unit is formed so that the temperature of the inside of said drawing tank is detected by a temperature sensor and a valve controller is actuated so as to adjust a valve automatically to thereby keep the inside of said drawing tank at a desired temperature.

5. A device for drawing a drawable thermoplastic resin material according to claim 1, wherein a packing member is used as each of said opening members and said packing member is constructed by one of stainless steel as a metal, and fluororesin resin and silicone resin as plastics.

6. A device for drawing a drawable thermoplastic resin material according to claims 1, wherein said pressurized steam to be used is composed of water vapor, said pressurizing medium is composed of pressurized water, and said buffer medium is composed of low-pressure water lower in pressure than said pressurized water.

7. A device for drawing a drawable thermoplastic resin material according to claim 1, further comprising:
a sealing unit disposed between said pressurizing medium tank and said buffer medium tank adjacent to each other, said sealing unit including:
a sealing portion constituted by a pair of upper and lower sealing rollers and a pair of side surface sealing plates, said pair of sealing rollers being disposed with a slight clearance in a wall surface of a pressurizing tank side fitment fixed to an end surface of said pressurizing medium tank and having a slit formed in its center portion, said pair of sealing rollers being rotatably supported by swing levers pressed by pressing members, said pair of side surface sealing plates being fixed to said pressurizing tank side fitment while being in contact with left and right end surfaces of said sealing rollers; and
a slit portion having a buffer tank side fitment and a shutter, said buffer tank side fitment being fixed to the end surface side of said buffer medium tank adjacent to said pressurizing medium tank and having a slit in its center portion, said shutter being fixed to said buffer tank side fitment and having an opening portion formed substantially in accordance with the sectional shape of said drawable material passing therethrough with a slight clearance;
wherein said slits and said opening portion are disposed in accordance with the passage line of said drawable material so that the amount of the pressurizing medium leaking out can be kept very small by said sealing portion.

8. A device for drawing a drawable thermoplastic resin material according to claim 7, wherein said shutter is cut into two at a vertical center portion thereof to thereby form an upper shutter and a lower shutter each of which is shaped to be a rectangular plate,
vertical guides having vertical facing surfaces are disposed with a distance in the left and right of said upper and lower shutters,
positioning units are provided so that head portions of fixing members fixed to said buffer tank side fitment are idly fitted and set into vertically long openings formed in said respective shutters,
said opening portion is set by adjustment of a vertical gap between said shutters sliding along said vertical guides respectively, and
said shutters can be fixed to said buffer tank side fitment by said positioning units.

9. A device for drawing a drawable thermoplastic resin material according to claim 8, further comprising:
a slit up/down adjuster including:
a rotation shaft being pivotally supported by a bearing fixed onto an adjuster fitment interposed between said shutter and said buffer tank side fitment, said rotation shaft having a thread in a lower portion thereof; and
a lifting block being thread-engaged with said thread of said rotation shaft and fixed to a center portion of an upper end surface of said upper shutter,
wherein said lifting block is moved up and down by rotation of said rotation shaft so as to move up and down said upper shutter in the vertical direction, whereby the vertical gap between said upper and lower shutters can be adjusted.

10. A device for drawing a drawable thermoplastic resin material according to claim 8, further comprising:
a width adjusting portion including:
upper and lower horizontal guides being fixed to upper and lower portions of said left and right vertical guides and having parallel surfaces with a vertical distance;
width adjusting materials being fitted between said respective horizontal guides and having a pair of vertical surfaces facing each other; and
positioning units being provided so that head portions of fixing members fixed to the shutter are idly fitted and set into laterally long openings formed in said width adjusting materials respectively,
wherein said width adjusting materials are slid laterally to adjust the lateral gap and can be fixed to said shutter by said positioning units.

11. A device for drawing a drawable thermoplastic resin material according to claim 8, further comprising:
a slit left/right adjuster including:
upper and lower horizontal guides being fixed to upper and lower portions of said left and right vertical guides and having parallel surfaces with a vertical distance;
width adjusting materials having a pair of facing vertical surfaces fitted between said respective horizontal guides, and through-holes formed from the lower left and right end surfaces toward the center portion with a thread; and
rotation shafts being pivotally supported by a pair of left and right bearings fixed outside said buffer medium tank, said rotation shafts having a thread from the intermediate portion to the center portion so as to be thread-engaged with said through-holes respectively,
wherein said width adjusting materials are slid laterally by the rotation of said rotation shafts respectively so that the lateral gap can be adjusted.

12. A device for drawing a drawable thermoplastic resin material according to claim 9, further comprising:
a pressing unit including:
a pair of pressing shafts being disposed onto lower sides of support plates vertically fixed with a distance onto an upper side of said upper shutter and/or width adjusting materials by stays so that said pair of pressing shafts face said upper shutter and/or width adjusting materials; and
pressing members being attached to said pressing shafts,
wherein said upper shutter and/or width adjusting materials can be pressed by said pressing members.

13. A device for drawing a drawable thermoplastic resin material according to claim 7, wherein a low-frictional plastic sheet material is fixed to any one of the contact surfaces of the side surface sealing plates with the end surfaces of said sealing rollers, the facing surfaces of said upper and lower shutters and the facing surfaces of said width adjusting materials.

14. A device for drawing a drawable thermoplastic resin material according to claim 1, further comprising:
left and right horizontal shafts disposed in the passage position of said drawable material on the upstream side of said first buffer medium tank and/or on the downstream side of said second buffer medium tank and juxtaposed with a distance on the upstream and downstream sides;

vertical shafts erected on end portions of intersection of said left and right horizontal shafts;

joints movably attached to said horizontal and vertical shafts; and a pair of rod-like guides laid between said joints on the upstream and downstream sides, wherein said guides are formed into such a shape that the lateral width between said guides is tapered downward in front view so that said drawable material can be moved sideways.

* * * * *